United States Patent
Siwiak et al.

(10) Patent No.: US 8,553,804 B2
(45) Date of Patent: Oct. 8, 2013

(54) WIRELESS COMMUNICATION SYSTEM AND METHOD WITH ELLIPTICALLY POLARIZED RADIO FREQUENCY SIGNALS

(76) Inventors: Kazimierz Siwiak, Coral Springs, FL (US); Yasaman Bahreini, San Diego, CA (US)

(*) Notice: Subject to any disclaimer, the term of this patent is extended or adjusted under 35 U.S.C. 154(b) by 0 days.

(21) Appl. No.: 13/330,663

(22) Filed: Dec. 19, 2011

(65) Prior Publication Data
US 2012/0236954 A1 Sep. 20, 2012

Related U.S. Application Data

(63) Continuation of application No. 11/775,211, filed on Jul. 9, 2007, now Pat. No. 8,081,699.

(60) Provisional application No. 60/807,478, filed on Jul. 15, 2006.

(51) Int. Cl.
*H04L 27/00* (2006.01)
*H04B 1/38* (2006.01)

(52) U.S. Cl.
USPC .......................... 375/299; 455/561

(58) Field of Classification Search
USPC .............. 375/299, 295, 296; 455/561, 562.1, 455/107
See application file for complete search history.

(56) References Cited

U.S. PATENT DOCUMENTS

| | | | |
|---|---|---|---|
| 5,751,252 A | 5/1998 | Phillips | |
| 5,764,696 A | 6/1998 | Barnes | |
| 6,195,064 B1 | 2/2001 | Andrews | |
| 6,411,824 B1 | 6/2002 | Eidson | |
| 6,414,647 B1 | 7/2002 | Lee | |
| 7,081,850 B2 * | 7/2006 | Small | 342/194 |
| 2004/0113850 A1 | 6/2004 | Olsen | |
| 2005/0152264 A1 * | 7/2005 | Siwiak | 370/206 |
| 2007/0282482 A1 | 12/2007 | Beucher | |

OTHER PUBLICATIONS

Dickison et al.—"Data Transmission Via Polarization Modulation of a 2.4 GHZ Circularly Polarized Radio Wave", Department of Physics, University of Missouri, Rolla, Fall Semester, pp. 1-34 (2002).
Johnson et al.—"Data Transmission Via Polarization Modulation of a 2.4 GHZ Circularly Polarized Radio Wave", Department of Physics, University of Missouri, Rolla, Fall Semester (2002), pp. 1-20, (Downloaded from http://campus.umr.edu/physics/alab/polar/paper.pdf on Jul. 13, 2006).
Siwiak—"UWB Channel Model for under 1 GHZ", IEEE P802.15 Wireless Personal Area Networks (WPANS), pp. 1-28 (submitted Sep. 2004).
Reisert—"Antenna Polarization Application Note", Astron Wireless Technologies, Inc. Technical Library, pp. 1-3, (downloaded from http://www.astronwireless.com/polarization.html on Jul. 11, 2006).
Wiki—"Circular Polarization", p. 1, (downloaded from http://en.wikipedia.org/wiki/Circular_polarization on Jul. 11, 2006).
Wilson—"Ultra-Wideband / A Disruptive RF Technology?", pp. 1-8, Intel Research & Development (2002).

* cited by examiner

*Primary Examiner* — Kevin Kim
(74) *Attorney, Agent, or Firm* — Mark P Kahler

(57) ABSTRACT

In one embodiment, a UWB transmission system includes a pair of crossed linearly polarized antennas, one of which is fed with a UWB signal current, while the second is fed with a temporally orthogonal UWB signal such as the time-derivative of the UWB signal current. The resultant elliptically polarized radiated fields are simultaneously orthogonal in space and orthogonal in time. In another transmission system, a loop and a co-located dipole are fed with the same current to generate signal exhibiting elliptical polarization. When the energies of the transmissions from each antenna are equal, the polarization is circular. Thus a UWB transmitting and receiving system is shown that utilizes signals that are simultaneously spatially orthogonal and temporally orthogonal, and the several combinations of those signal and polarization states encode data for transmission.

17 Claims, 19 Drawing Sheets

00 state 01 state 10 state 11 state

FIG. 18 — TRANSMIT PROCESS

WIRELESS COMMUNICATION SYSTEM AND METHOD WITH ELLIPTICALLY POLARIZED RADIO FREQUENCY SIGNALS

RELATED PATENT APPLICATIONS

This patent application is a continuation of, and claims priority to, U.S. patent application Ser. No. 11/775,211, filed Jul. 9, 2007, which claims priority to Provisional U.S. Patent Application Ser. No. 60/807,478, filed Jul. 15, 2006, inventors Siwiak and Bahreini, entitled "Wireless Communication System And Method Using With Elliptically Polarized Radio Frequency Signals", which is incorporated herein by reference in its entirety.

TECHNICAL FIELD OF THE INVENTION

The disclosures herein relate generally to wireless communication systems, and more particularly, to ultra-wideband (UWB) communication systems.

BACKGROUND

Communication systems that employ linear polarization transmit electromagnetic waves wherein the electric field is confined to a particular plane along the direction of wave propagation. Vertical polarization and horizontal polarization are two prevalent types of linear polarization that are employed by many communication systems. A vertically polarized antenna generates an electric field that is perpendicular to the Earth's surface and a magnetic field perpendicular to the electric field and parallel to the earth's surface. In contrast, a horizontally polarized antenna generates an electric field that is parallel to the Earth's surface and a magnetic field perpendicular to the electric field and perpendicular to the earth's surface.

In communication systems that use circular polarization, the electromagnetic signal or radio frequency (RF) signal is transmitted such that the tip of the electric field vector describes a circle in any plane normal to the direction of signal propagation. However, in communication systems that employ elliptical polarization, the RF signal is polarized such that the tip of the electric field vector describes an ellipse in any plane normal to the direction of signal propagation. Circular polarization represents a limited type or subset of the more general elliptical polarization, wherein the tip of the electrical field vector describes a circle in a plane normal to the direction of signal propagation. Circular polarization may be regarded as left-handed circular polarization or right-handed circular polarization depending on the direction that the electric field vector rotates as the signal wave propagates past a particular point.

As compared with communication systems that employ linear polarization for radio frequency signal transmission and reception, communication systems that employ elliptical polarization provide several benefits. For example, systems employing elliptical polarization may suppress some multipath reflection components. Elliptical polarization systems may also penetrate through scattering media better than systems using other polarization types. In radar applications, systems that employ elliptical polarization may exhibit better range and resolution for polarization dependent targets.

The U.S. Pat. No. 5,764,696 to Barnes, et al. contains examples of "chiral" polarization used in ultra-wideband (UWB) transmissions. Chiral polarization requires increased transmission time for the signal as compared with linear polarization. Thus, chiral polarization unfortunately negatively impacts the traffic capacity of communication systems that employ this technology. Barnes shows a type of chiral polarization wherein one antenna emits a signal and a second antenna emits the same signal delayed in time. The two antennas are perpendicular to one another and are thus in a space quadrature relationship. In such chiral polarization, one antenna is effectively supplied with a time delayed copy of the signal supplied to the other space-quadrature antenna. While the chiral radiated polarization vector does appear to an observer to rotate in space, the polarization is not truly circular and does not have all the known benefits of true circular polarization. Because of the needed delay time, the transmission time with chiral polarization is equal to the pulse duration plus the time delay between the pulse sent in one linear polarization and the corresponding delayed pulse sent in the second linear polarization. In chiral polarization, the signal may be delayed by an amount of time greater than a pulse width. Hence, chiral polarization may unfortunately consume twice the channel time of a linear polarization.

Circular polarization may be helpful in suppressing multipath propagation components that involve one or any odd number of reflections because an odd number of reflections inverts the circular polarization sense. Thus, upon one or an odd number of reflections, left-handed circular polarization inverts to right-handed circular and vice-versa. In a typical in-room scenario for short range high data rate UWB communications, a radar scenario or an imaging scenario, a single reflection may be only 5 dB smaller than a direct path signal as explained in SIWIAK "UWB Channel Model for under 1 GHz (VHF and UHF)", IEEE P802.15 Working Group for Wireless Personal Area Networks (WPANs), IEEE document P802.15-02/505r4, September 2004. Second order reflections, on the other hand, namely those involving two bounces, may already be suppressed by as much as 10 dB. With circular polarization, the strongest multipath reflections are suppressed because of the polarization inversion.

What is needed is a UWB transmission system and methodology that addresses the problems above.

SUMMARY

Accordingly, in one embodiment a two port antenna is disclosed that emits radiated fields that are in space quadrature, that is, when one or the other antenna port is supplied with a signal, the emitted polarizations are orthogonal in space. The transmission system further includes a mechanism for supplying currents to the two antenna ports so that the radiated fields are also orthogonal in time. In one embodiment, a receiving system performs operations reciprocal to those of the transmission system to recover the transmitted signal.

Accordingly, in another embodiment, an antenna system is disclosed that includes co-located electric and magnetic antennas that are oriented to provide orthogonally polarized radiation components, for example a co-located dipole antenna and loop antenna. Because UWB radiation from a dipole involves a time derivative of the supplied current, and radiation from a loop involves a second derivative with respect to time of the supplied current, the radiated field components have the necessary time-derivative relationship and are orthogonal in both time and in space. In this embodiment, the same current shape is supplied to both antennas. Left-handed and right-handed polarizations are constructed by inverting the polarity of one of the antenna signals via polarity modulation.

In yet another embodiment, an antenna system is disclosed that includes a pair of co-located crossed dipole antennas that are oriented at an angle of 90 degrees with respect to one another. One dipole antenna is supplied with a UWB current, while the other dipole antenna is simultaneously supplied with the time-derivative of the UWB current. The time derivative operation is performed in the generation of the UWB pulse itself, either in a DSP or in the mixing operation to frequency shift the baseband pulse to the operating band. A cosine carrier multiplier generates one signal, and a sine carrier multiplier generates the orthogonal pulse. The emitted fields are orthogonal in space as well as in time, and thus the fields are elliptically polarized. The transmission time is equal to the transmission time of a linearly polarized signal so UWB link channel capacity is not impaired. When the energies supplied to each of the dipoles are equal, the resulting emissions are circularly polarized. Inverting the polarity of either signal changes the sense of the polarization from a right-handed elliptical polarization to a left-handed elliptical rotation, or vice-versa. In a communication system embodiment, orthogonal polarizations are applied to form a polarization modulated communications system, which may further employ coding techniques to improve the communication system.

In one embodiment, an ultra-wideband (UWB) transmission system is disclosed. The UWB transmission system includes an antenna system that is configured to emit first and second radiated RF signals that are orthogonally polarized in space when the antenna system is driven by first and second drive signals, respectively. The UWB transmission system also includes a transmitter, coupled to the antenna system, that drives the antenna system with the first and second drive signals, the first and second drive signals being configured to cause the first and second radiated RF signals to be orthogonal in time when emitted by the antenna system.

In another embodiment, a method of transmitting RF signals by a transmission system is disclosed. The method includes configuring an antenna system to emit first and second radiated RF signals that are orthogonally polarized in space when the antenna system is driven by first and second drive signals. The method also includes supplying, by a transmitter, the first and second drive signals to the antenna system, the first and second drive signals being configured to cause the first and second radiated RF signals to be orthogonal in time when emitted by the antenna system.

In yet another embodiment, a polarization modulation ultra-wideband (UWB) transmission system is disclosed. The UWB transmission system includes an antenna system that is configured to emit first and second radiated RF signals that are orthogonally polarized in space when the antenna system is driven by first and second drive signals, respectively. The UWB transmission system includes a transmitter, coupled to the antenna system, that drives the antenna system with the first and second drive signals, the first and second drive signals being configured to cause the first and second radiated RF signals to be orthogonal in time when emitted by the antenna system. The transmitter includes an input for receiving data. The transmitter also includes a polarization orthogonal keying (POK) encoder, coupled to the input, the POK encoder imparting a positive or negative polarity to the first drive signal and imparting a positive or negative polarity to the second drive signal, to encode the first and second radiated RF signals with the data.

In another embodiment, a method is disclosed for transmitting RF signals. The method includes configuring an antenna system to emit first and second radiated RF signals that are orthogonally polarized in space when the antenna system is driven by first and second drive signals, respectively. The method also includes driving, by a transmitter, the antenna system with the first and second drive signals, the first and second drive signals being configured to cause the first and second radiated RF signals to be orthogonal in time when emitted by the antenna system. The method further includes receiving data, by an input of the transmitter. The method still further includes encoding, by an polarization orthogonal keying (POK) encoder in the transmitter, the first and second drive signals with the data, the POK encoder imparting a positive or negative polarity to the first drive signal and imparting a positive or negative polarity to the second drive signal, to encode the first and second radiated RF signals with the data.

In another embodiment, an ultra-wideband (UWB) receiving system is disclosed. The UWB receiving system includes an antenna system that captures a UWB signal, the UWB signal including a first signal portion that exhibits spatial orthogonality and temporal orthogonality with respect to a second signal portion of the UWB signal, the antenna system including a first antenna and a second antenna that are configured to resolve the spatial orthogonality of the first signal portion with respect to the second signal portion such that the first antenna provides a first captured signal dependent on the first signal portion and the second antenna provides a second captured signal dependent on the second signal portion. The UWB receiving system also includes a receiver, coupled to the antenna system, that resolves temporal orthogonality between the first captured signal and the second captured signal to recover information from the first and second captured signals.

In yet another embodiment, a method of receiving a UWB signal is disclosed. The method includes capturing, by an antenna system, a UWB signal, the UWB signal including a first signal portion that exhibits spatial orthogonality and temporal orthogonality with respect to a second signal portion of the UWB signal, the antenna system including a first antenna and a second antenna that are configured to resolve the spatial orthogonality of the first signal portion with respect to the second signal portion such that the first antenna provides a first captured signal dependent on the first signal portion and the second antenna provides a second captured signal dependent on the second signal portion. The method also includes processing, by a receiver, the first and second captured signals from the antenna system to resolve temporal orthogonality between the first captured signal and the second captured signal to recover information from the first and second captured signals.

In another embodiment, a polarization modulation ultra-wideband (UWB) receiving system is disclosed. The receiving system includes an antenna system that captures a UWB signal, the UWB signal exhibiting a first polarization to indicate a first logic state, the UWB signal exhibiting a second polarization to indicate a second logic state, the UWB signal including a first signal portion that exhibits spatial orthogonality and temporal orthogonality with respect to a second signal portion of the UWB signal, the antenna system including a first antenna and a second antenna that are configured to resolve the spatial orthogonality of the first signal portion with respect to the second signal portion such that the first antenna provides a first captured signal dependent on the first signal portion and the second antenna provides a second captured signal dependent on the second signal portion. The receiving system also includes a receiver, coupled to the antenna system, that resolves temporal orthogonality between the first captured signal and the second captured signal, the receiver including a decoder that decodes the polarization exhibited by the UWB signal as represented by the first and second captured signals, the decoder outputting a first logic state when the decoder detects the first polarization and outputting a second logic state when the decoder detects the second polarization.

In still another embodiment, a polarization modulation ultra-wideband (UWB) receiving system is disclosed. The receiving system includes an antenna system that captures a UWB signal, the UWB signal exhibiting a plurality of different polarizations corresponding to a respective plurality of symbols, a the UWB signal including a first signal portion that exhibits spatial orthogonality and temporal orthogonality with respect to a second signal portion of the UWB signal, the antenna system including a first antenna and a second antenna that are configured to resolve the spatial orthogonality of the first signal portion with respect to the second signal portion such that the first antenna provides a first captured signal dependent on the first signal portion and the second antenna provides a second captured signal dependent on the second signal portion. The receiving system also includes a receiver, coupled to the antenna system, that resolves temporal orthogonality between the first captured signal and the second captured signal, the receiver including a decoder that decodes the plurality of polarizations exhibited by the UWB signal as represented by the first and second captured signals, the decoder outputting symbols that depend on the particular polarizations of the UWB signal that the decoder decodes.

In another embodiment, a method of receiving a polarization modulated UWB signal is disclosed. The method of receiving includes capturing, by an antenna system, a UWB signal that exhibits a plurality of different polarizations corresponding to a respective plurality of symbols, the UWB signal including a first signal portion that exhibits spatial orthogonality and temporal orthogonality with respect to a second signal portion of the UWB signal, the antenna system including a first antenna and a second antenna that are configured to resolve the spatial orthogonality of the first signal portion with respect to the second signal portion such that the first antenna provides a first captured signal dependent on the first signal portion and the second antenna provides a second captured signal dependent on the second signal portion. The method also includes processing, by a receiver, the first captured signal and the second captured signal to resolve temporal orthogonality between the first captured signal and the second captured signal. The method further includes decoding, by a decoder in the receiver, the plurality of polarizations exhibited by the UWB signal as represented by the first and second captured signals, the decoder outputting symbols that depend on the particular polarizations of the UWB signal that the decoder decodes.

In yet another embodiment, a method of receiving a polarization modulated UWB signal is disclosed. The receiving method includes capturing, by an antenna system, a UWB signal that exhibits a first polarization to indicate a first logic state and a second polarization to indicate a second logic state, the UWB signal including a first signal portion that exhibits spatial orthogonality and temporal orthogonality with respect to a second signal portion of the UWB signal, the antenna system including a first antenna and a second antenna that are configured to resolve the spatial orthogonality of the first signal portion with respect to the second signal portion such that the first antenna provides a first captured signal dependent on the first signal portion and the second antenna provides a second captured signal dependent on the second signal portion. The method also includes processing, by a receiver, the first captured signal and the second captured signal to resolve temporal orthogonality between the first captured signal and the second captured signal. The method further includes decoding, by a decoder in the receiver, the plurality of polarizations exhibited by the UWB signal as represented by the first and second captured signals, the decoder outputting a first logic state when the decoder detects the first polarization and outputting a second logic state when the decoder detects the second polarization.

BRIEF DESCRIPTION OF THE DRAWINGS

The appended drawings illustrate only exemplary embodiments of the invention and therefore do not limit its scope, because the inventive concepts lend themselves to other equally effective embodiments.

DETAILED DESCRIPTION

Figure 1:
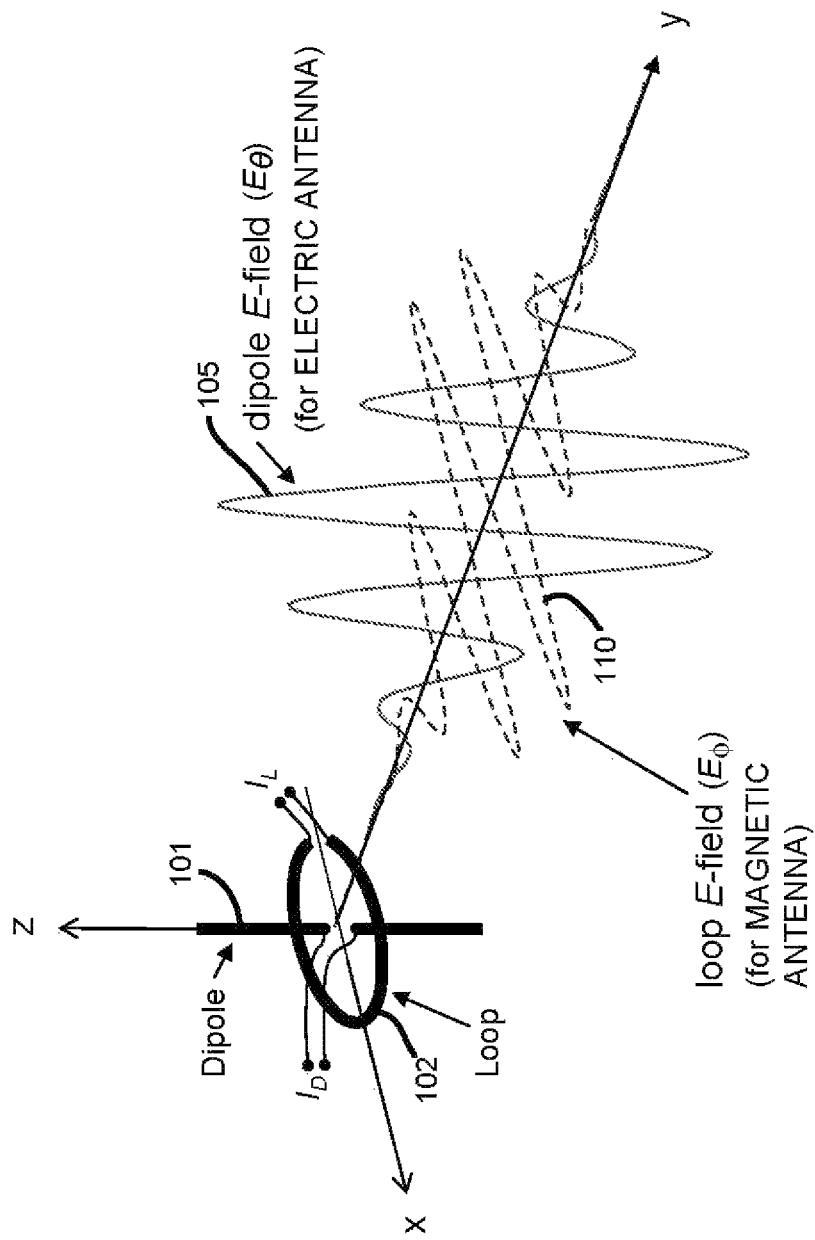
FIG. 1 shows the electric fields generated by transmission from a dipole and a loop in one example of the disclosed communication system and methodology.

Ultra-wideband (UWB) pulse signals are different from conventional narrow band signals. UWB pulse signals typically occupy a large radio frequency bandwidth, such as approximately 20% of the center frequency as one example. The signal bandwidth is proportional to the inverse of the signal pulse duration. Thus a pulse of about 1 nanosecond duration has a bandwidth of about 1 GHz. The difference between UWB pulse signals and conventional narrow band signals is revealed in a close examination of elliptical or circular polarization for short duration pulses. FIG. 1 shows an electric antenna, namely a dipole 101, aligned with the z-axis and a magnetic antenna, namely a loop 102, in the x-y plane. The far electric field (E field) of the dipole 101 of incremental length $\Delta h$ along the z-axis is given by Equation 1 below:

$$E_D(r, t) = \frac{\sin(\theta)}{4\pi\varepsilon_0 rc} \frac{\Delta h}{c} \frac{\partial}{\partial t} I(\tau) \hat{\theta} \quad \text{EQUATION 1}$$

where $\tau = t - r/c$ and where t is time, r is the distance from the antenna to the observation point and c is the speed of propagation, equal to the speed of light. The angle $\theta$ is measured from the z-axis to the axis of propagation along the r direction in the standard spherical coordinate system.

Also in FIG. 1, the far electric field of the loop 102 with incremental enclosed area $\Delta S$ is given by Equation 2 below:

$$E_L(r, t) = \frac{\sin(\theta)}{4\pi\varepsilon_0 rc} \frac{\Delta S}{c^2} \frac{\partial^2}{\partial t^2} I(\tau) \hat{\varphi} \quad \text{EQUATION 2}$$

where $\hat{\varphi}$ is a unit vector angular direction in the x-y plane and measured from the x-axis, in the standard cylindrical coordinate system. The total electric field of the combined pair of antennas of FIG. 1 is given by Equation 1 below:

$$E(r,t) = E_D(r,t)\hat{\theta} + E_L(r,t)\hat{\varphi} \quad \text{EQUATION 3}$$

In one embodiment, the dipole antenna 101 and loop antenna 102 that form the dipole-loop antenna pair are supplied with the same UWB pulse current. One suitable UWB current I(t) is a Gaussian-shaped baseband pulse with UWB bandwidth $f_{UWB}$ such as given by Equation 4 below:

$$I(t) = \exp(-t^2 2\pi \log(e) f_{UWB}) \sin(2\pi f_0 t) \quad \text{EQUATION 4}$$

The particular scaling here is such that the 10 dB down points of the spectrum of the Gaussian pulse conform to the FCC Part 15(f) definition of bandwidth $f_{UWB}$. Further background information is in Chapter 5 of the publication K. Siwiak and D. McKeown, *Ultra-wideband Radio Technology*, Wiley, UK, 2004] and in Chapters 1 and 6 of *Radiowave Propagation and Antennas for Personal Communication—third edition*, K. Siwiak and Y. Bahreini, Artech, Norwood Mass., 2007. The baseband pulse is translated to the center frequency $f_0$ by the sine term in Equation 4.

Elliptical polarization for a UWB pulse as disclosed herein is defined by the superposition of the two orthogonal field components so the far field energies are proportional to $W_\theta$ and $W_\varphi$ as given by Equations 5 and 6 below, respectively.

$$W_\theta = \left(\frac{\eta_0 \sin(\theta)}{4\pi r}\right)^2 \int \left(\frac{\Delta h}{c} \frac{\partial}{\partial t} I(t)\right)^2 dt \quad \text{EQUATION 5}$$

$$W_\varphi = \left(\frac{\eta_0 \sin(\theta)}{4\pi r}\right)^2 \int \left(\frac{\Delta S}{c^2} \frac{\partial^2}{\partial t^2} I(t)\right)^2 dt \quad \text{EQUATION 6}$$

And thus, Equation 7 shows the condition that is satisfied when the dipole and loop antenna fields are radiated in space. Equation 7 describes the equation for an ellipse:

$$\frac{E_D(r, t)^2}{W_\theta} + \frac{E_L(r, t)^2}{W_\varphi} = 1 \quad \text{EQUATION 7}$$

so that the peak value of the total field $E(r,t) = E_D(r,t)\hat{\theta} + E_L(r,t)\hat{\varphi}$ traces out an ellipse in space. In combination, Equations 5, 6 and 7 define an ellipse. The polarization is circular when $W_\theta = W_\varphi$.

Figure 2:
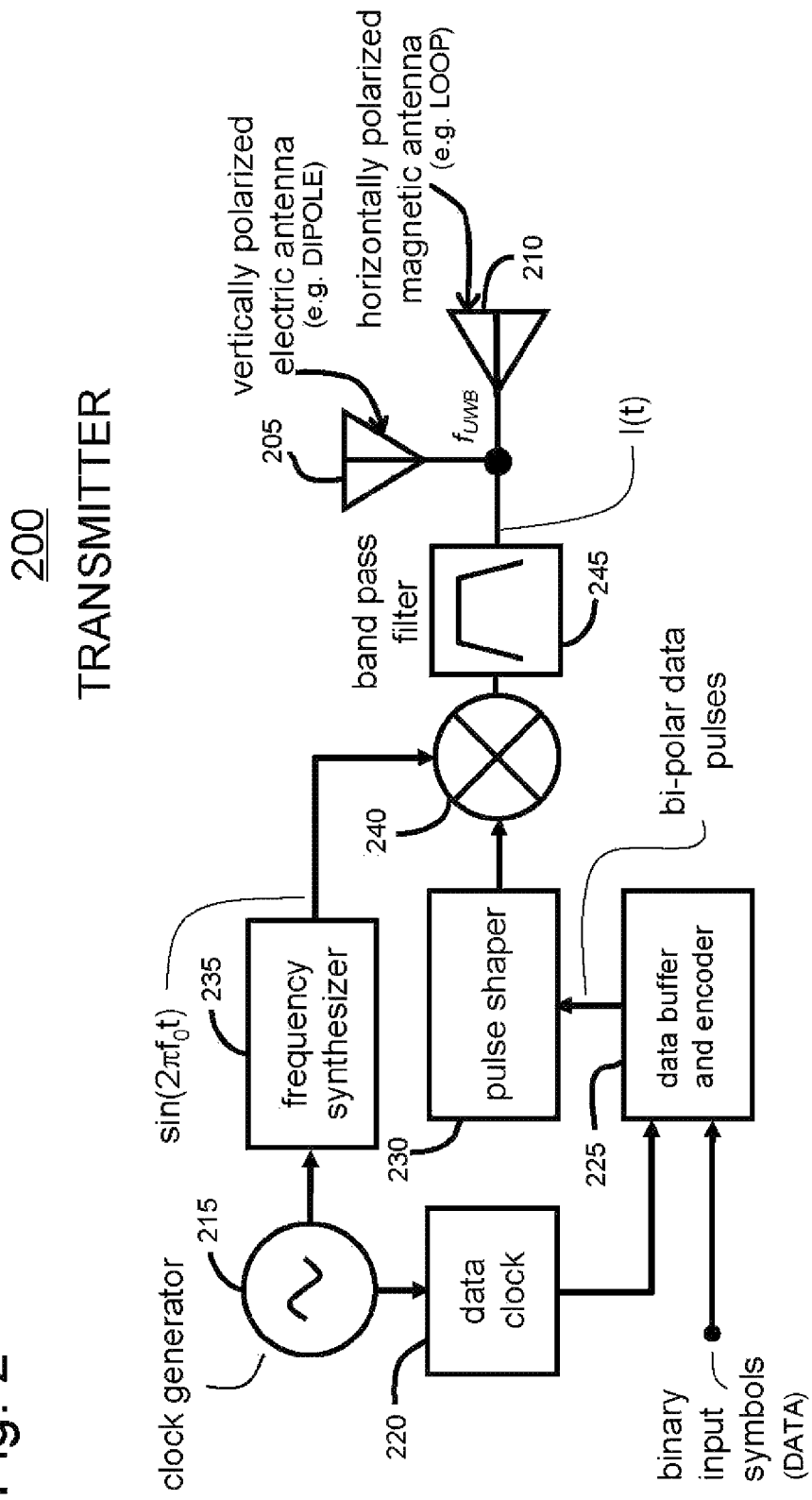
FIG. 2 shows a transmitter using a dipole and loop antenna pair in a one example of the disclosed communication system and methodology.

FIG. 2 shows a UWB transmitter 200 configured to transmit electromagnetic signals exhibiting elliptical polarization using an antenna pair that includes an electric antenna 205 such as a dipole co-located with a magnetic antenna 210 such as a loop. The transmitter 200 includes a reference oscillator 215 that drives a data clock generator 220 which clocks data pulses that are polarity encoded at data buffer and encoder 225. Data buffer 225 may provide level shifting if needed. Pulse shaper 230 provides pulse shaping at baseband to generate polarity-encoded UWB pulses. More particularly, pulse shaper 230 provides baseband filtration to the baseband UWB pulses so that their spectral characteristics are suitable for band limited transmission. A Gaussian-shaped filter, or a raised cosine filter, a root raised cosine filter, or many other well-known filter shapes may be used as pulse shaper 230 so long as the desired UWB spectral shape is obtained. For example, and not to be taken as limiting the disclosed system and method, a Gaussian pulse shape may be used here in pulse shaper 230 for mathematical convenience. A sequence of pulses may be data encoded with orthogonal or bi-orthogonal codes such as Walsh-Hadamard codes, Golay codes, Gold codes, Kasami Codes, m-sequence or Barker codes.

These pulses from pulse shaper 230 are translated to a required UWB center frequency $f_0$ by using a frequency synthesizer 235 to generate a sine signal at the UWB center frequency. The output of frequency synthesizer 235 couples to one input of a mixer 240. The remaining input of mixer 240 couples to the output of pulse shaper 230 to receive the baseband UWB pulse signal therefrom. Mixer 240 up-converts or translates the baseband UWB signal from pulse shaper 230 to the desired operating or transmit frequency. A band pass filter 245 couples the output of mixer 240 to electric antenna 205 and magnetic antenna 210. Band pass filter 245 attenuates undesired signals outside the desired operating frequency band. In one embodiment, band pass filter 245 and pulse shaper 230 share pulse shaping duties. In an alternative embodiment, instead of pulse shaper 230 shaping UWB pulses at baseband, band pass filter 245 provides pulse shaping to the up-converted UWB pulse signal. In yet another embodiment, instead of band pass filter 245 providing pulse shaping, pulse shaper 230 provides all pulse shaping or filtration of the baseband UWB signal. In this particular embodiment, the electric antenna 205 is a dipole and the magnetic antenna 210 is a loop. It will be appreciated that any electric-magnetic pair of antennas can be used with the same or substantially similar effect. The magnetic equivalent of an electric antenna element can be found from the well known Babinet Principle. The transmitter of FIG. 2 achieves spatial orthogonality by orienting the two antennas so that they emit electric fields that are spatially orthogonal. The signal orthogonality is impressed by using two antennas whose respective electric fields in space are related to each other by a time-derivative operation, such as a loop and a dipole. Thus both the required spatial and temporal orthogonalities are realized in the transmitter of FIG. 2. Spatial orthogonality refers to the orthogonality of two signals, for examples two E fields, in space. Temporal orthogonality refers to orthogonality between two signals, for examples two E fields, in time. In one embodiment, the drive signal that the transmitter supplies to electric antenna 205 is substantially the same as the drive signal that the transmitter supplies to the magnetic antenna 210. The UWB pulse drive signal that is applied to electric antenna 205 and the UWB pulse signal that is applied to electric antenna 205 are timed such that the resultant RF signal radiated by antennas 205 and 210 are orthogonal in time.

Returning to FIG. 1, this figure shows a rendition 105 of the desired vertically polarized electric waveform $E_\theta$ projected on the z-y plane, and the projection 110 on the x-y plane of the horizontally polarized waveform $E_\phi$. Electric antenna 105 generates the vertically polarized waveform $E_\theta$ while magnetic antenna 102 generates the horizontally polarized waveform $E_\phi$. The two waveforms are orthogonal in space and they are also orthogonal in time—one has even symmetry while the other has odd symmetry, and they appear simultaneously in time. According to the definitions for UWB elliptical polarization, the combined electric field traces a spiraling path in space as it travels in the propagation direction, here shown along the y-axis. When the energies contained in the two orthogonal signals are equal, the polarization is circular or otherwise it is elliptical. The shape of the signal projected on the x-y plane and the shape of the signal projected on the z-y plane exhibit even and odd symmetries. The terms "space quadrature" or "orthogonal in space" mean that two signal polarizations are perpendicular such as in horizontal and vertical planes. Horizontally polarized and vertically polarized signals are thus in space quadrature because their E fields are orthogonal or perpendicular to one another in space. UWB signals are orthogonal in time when they occur simultaneously in time, and the integral of their mathematical product over the duration of the UWB pulse signal is zero. UWB signals meeting these criteria are orthogonal in time. A time function with even symmetry about its center and a time function with odd symmetry about its center are an example of signals that are orthogonal in time.

Figure 3:
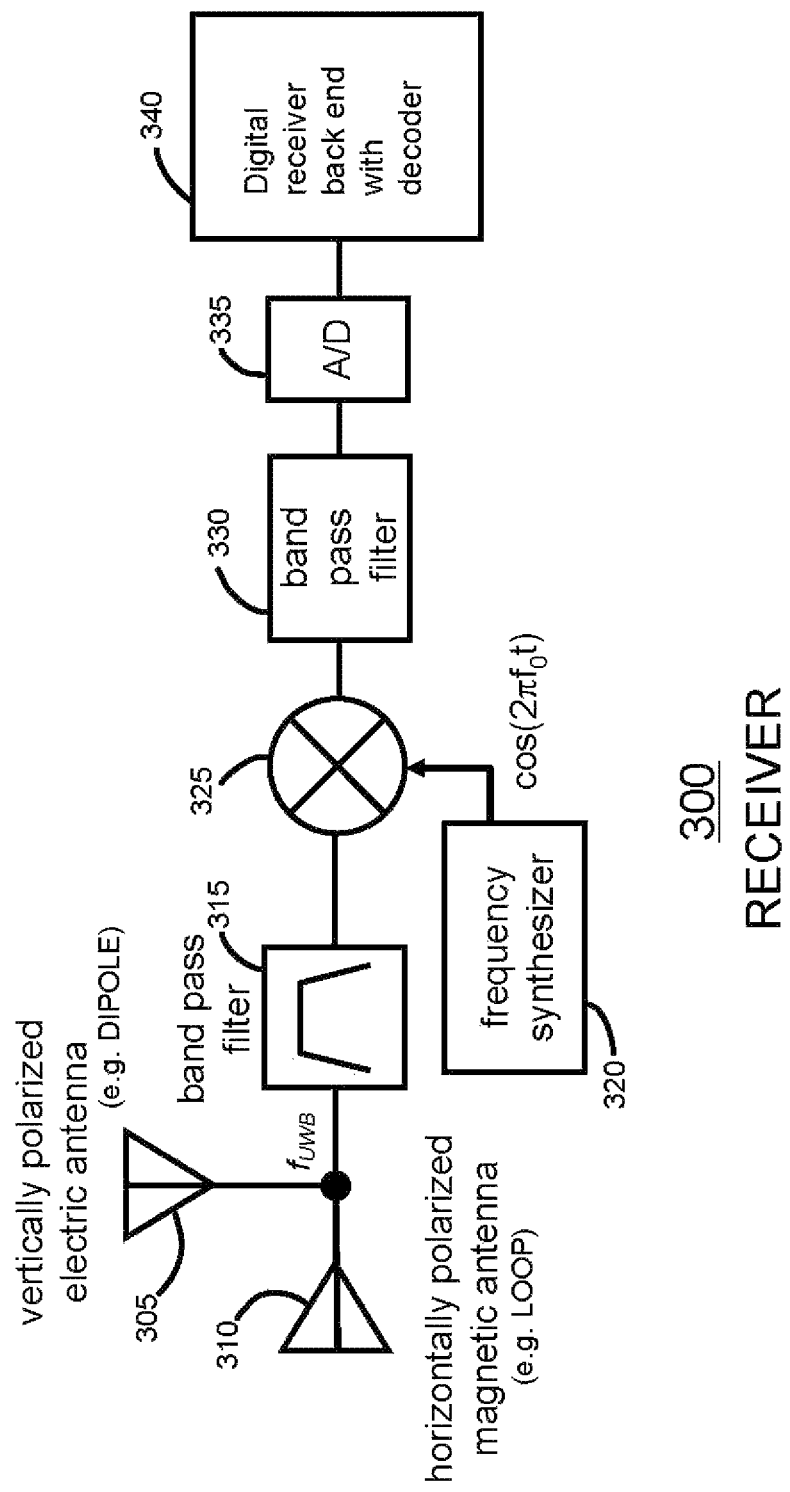
FIG. 3 shows a receiver using a dipole (electric antenna) and loop (magnetic antenna) pair in one example of the disclosed communication system and methodology.

FIG. 3 shows a UWB pulse receiver 300 configured to receive elliptically polarized radio frequency signals. This UWB pulse receiver 300 employs a combined vertically polarized electric antenna 305 and a horizontally polarized magnetic antenna 310. The terms vertically and horizontally are used here in a relative sense, and the important relationship is that their E field polarizations are orthogonal in space. The receiver uses a band pass filter 315 to filter the $f_{UWB}$ wide UWB pulse signal. A frequency synthesizer 320 couples to one input of a mixer 325 to control the receive frequency. Band pass filter 315 couples to a remaining input of mixer 325 to provide a band pass filtered signal thereto. Mixer 325 down-converts and recovers a baseband copy of the UWB pulse which is then filtered by band pass filter 330 and digitized by A/D converter 335. The resultant digital signal is fed to a digital baseband receiver back end with decoder 340 and processed thereby to recover data. Although FIG. 3 shows a largely analog example of the disclosed receiver, we contemplate using digital sampling of the RF energy and implementing the equivalent functions in digital form as shown below in FIG. 16. In the receiver of FIG. 3, the spatial orthogonality is resolved by orienting the two antennas so that one is sensitive to one linear polarization while the other is sensitive to the orthogonal polarization, namely perpendicular to the first polarization. The signal orthogonality is resolved because the fields received by an electric and a magnetic antenna are related by a time-derivative and so they are spatially orthogonal.

Figure 4:
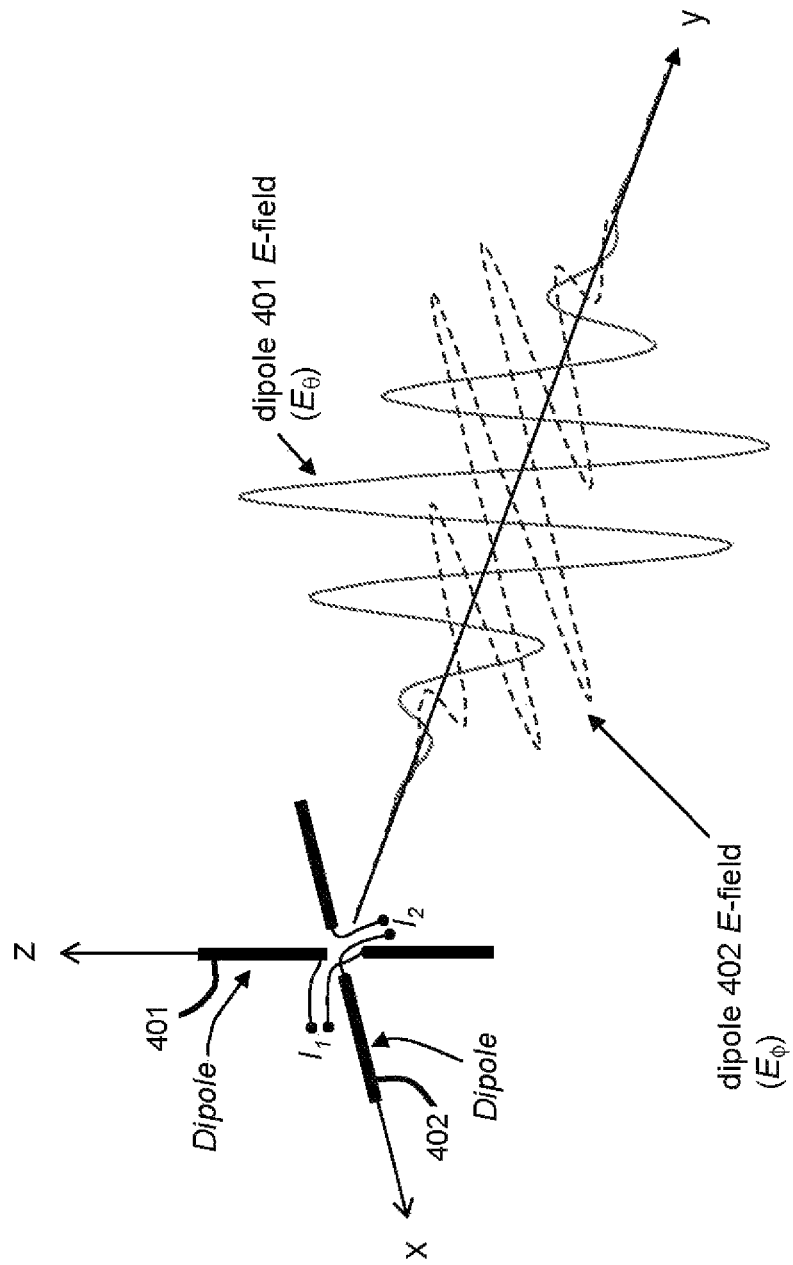
FIG. 4 shows the electric fields generated by transmission from an antenna formed by a dipole loop pair in another example of the disclosed communication system and methodology.

FIG. 4 shows an embodiment including a pair of co-located electric antennas, namely crossed dipole antennas 401 and 402, that may be employed in the disclosed system as transmit antennas or alternatively as receive antennas. However, other two co-located orthogonally polarized antenna pairs may produce acceptable results as well. For example, another suitable antenna is a dual feed horn antenna having feed points that are orthogonal, such as a dual cross ridge horn antenna, or a co-located orthogonally polarized pair of magnetic antennas, namely loop antennas. FIG. 4 also depicts a representative desired vertically polarized electric waveform $E_\theta$ projected on the z-y plane, and the projection on the x-y plane of the horizontally polarized waveform $E_\phi$. The two waveforms are orthogonal in space. The two waveforms are also orthogonal in time, namely one exhibits even symmetry while the other exhibits odd symmetry. These two waveforms also appear simultaneously in time. According to the definitions for UWB elliptical polarization, the combined electric field traces a spiraling path in space as it travels in the propagation direction shown here along the y-axis.

Figure 5:
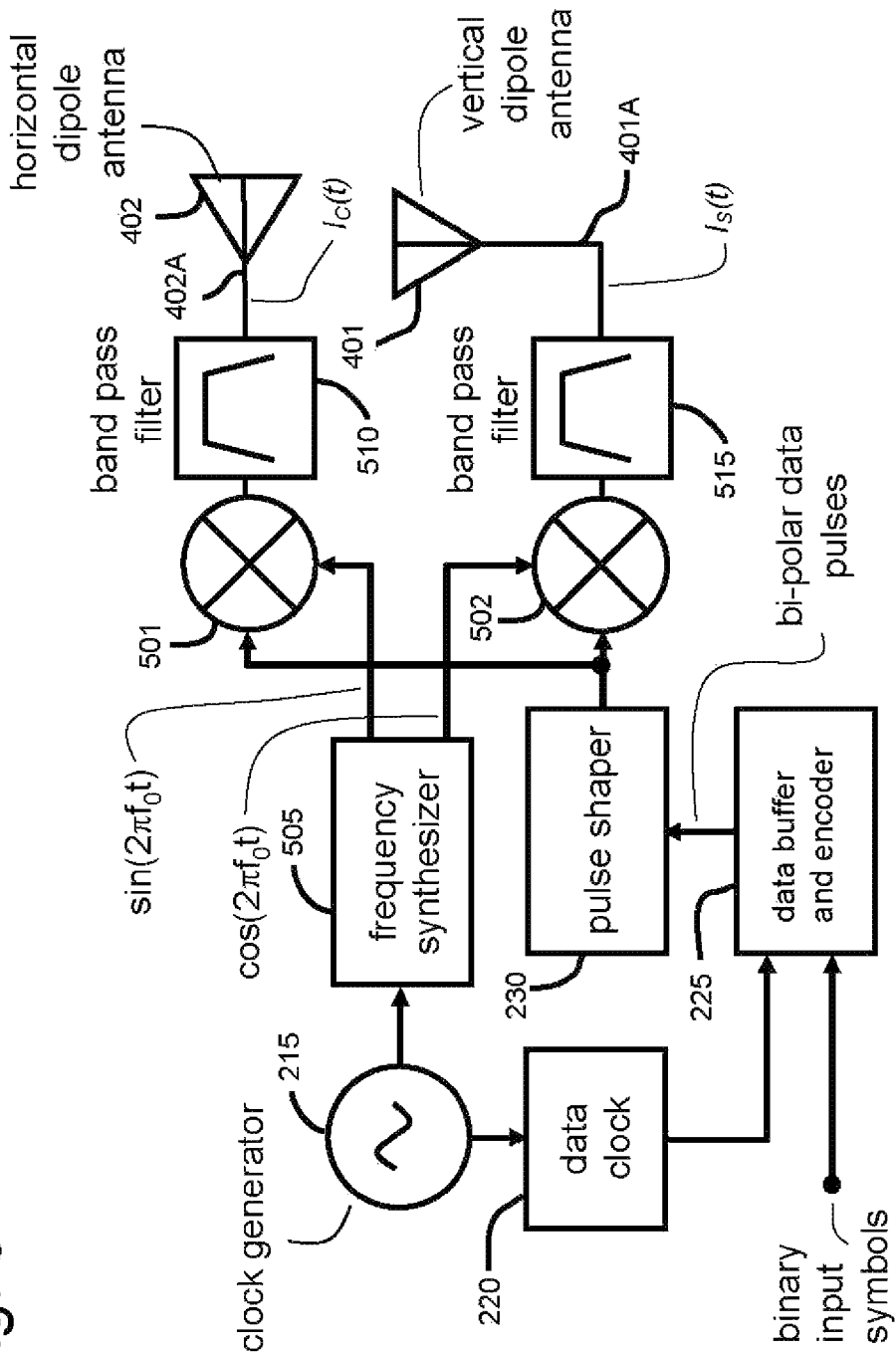
FIG. 5 shows a transmitter using a crossed-dipole antenna pair in accordance with one embodiment of the disclosed communication system and methodology.

FIG. 5 shows one embodiment of a UWB transmitter 500 for driving the above disclosed antenna structures of FIG. 4 so that circular, or more generally, elliptical polarization is emitted. UWB transmitter 500 of FIG. 5 includes several elements in common with UWB transmitter 200 of FIG. 2. Like numbers indicate like elements when comparing these two structures. The transmitter 500 includes a reference clock oscillator 215 which clocks data pulses that are polarity encoded and filtered with a baseband filter in pulse shaper 230 to obtain Gaussian shaped polarity encoded UWB pulses. A sequence of the pulses may be encoded with orthogonal or bi-orthogonal codes such as Walsh-Hadamard, Golay Codes, Gold codes, Kasami Codes, m-sequence or Barker codes. The encoding occurs in an encoder (not shown) coupled to the binary input symbol port. In this manner, the binary input symbols or data are encoded before being supplied to the data buffer 225. Other orthogonal or bi-orthogonal codes may also be suitable depending on the particular application. The resultant encoded pulses at baseband that pulse shaper 230 generates are translated or up-converted to a desired UWB center frequency $f_0$ by mixers 501 and 502. Mixers 501 and 502 each receive the encoded UWB pulses at respective mixer inputs. Frequency synthesizer 505 supplies sine and cosine signals at the UWB center frequency to respective inputs of mixers 501 and 502 to up-convert the encoded UWB pulses into two signals. The up-converted UWB signals at the outputs of mixers 501 and 502 are filtered by respective band pass filters 510 and 515. The two resultant temporally orthogonal transmitter currents supplied to the respective antennas 401 and 402 are given by Equations 8 and 9 below:

$$I_S(t) = \exp(-t^2 2\pi \log(e) f_{UWB}) \sin 2\pi f_0 t \quad \text{EQUATION 8}$$

$$I_C(t) = \exp(-t^2 2\pi \log(e) f_{UWB}) \cos(2\pi f_0 t) \quad \text{EQUATION 9}$$

Figure 17:
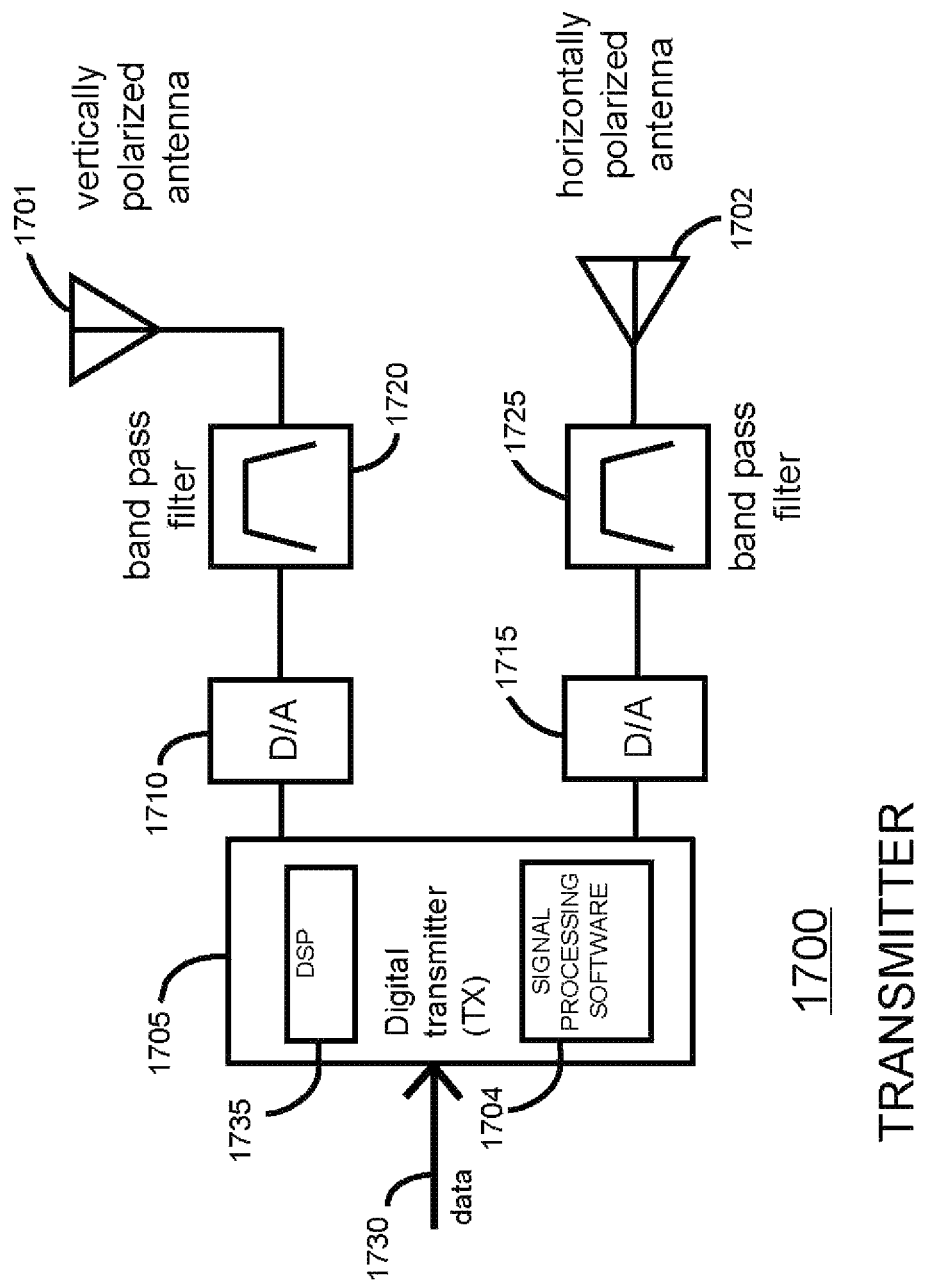
FIG. 17 shows a fully digital transmitter embodiment in accordance with the disclosed system and methodology.

The currents $I_S(t)$ and $I_C(t)$ are approximately related to each other by a time-derivative operation, especially when the bandwidth of the UWB pulse is less than about 150%. These currents are also polarity modulated according to the polarity of the bi-polar data pulses shown in FIG. 5. Bi-polar pulses are binary data that take on positive or negative amplitudes corresponding to data 1's and 0's. Any pair of time-orthogonal UWB pulses may be used to drive the two antennas 401 and 402, and filtering shapes for pulse shaper 230 other than a Gaussian shape may also be suitable. A Gaussian-shaped filter, or a raised root cosine filter, or many other well-known filter shapes may be used so long as desired spectral shape is obtained. Desired spectral shapes conform to regulatory emission limits. Again, although FIG. 5 shows an analog representation of transmitter 500, the transmitter may also be implemented digitally by using a high speed digital to analog converter to drive the antennas 401 and 402, either directly or with an intervening radio frequency (RF) power amplifier. $I_S(t)$ is applied to the vertically polarized antenna terminal 401A, and $I_C(t)$ is applied to the horizontally polarized antenna terminal 402A. The radiation process for a dipole involves a same time derivative in each of the antenna ports, so the form of the combined electric waveform retains the time derivative relationship between the currents as shown in FIG. 4. FIG. 17 shows an equivalent fully digital implementation of a suitable transmitter and is discussed below. In one embodiment, the UWB pulse drive signal that is applied to electric antenna 401 and the UWB pulse signal that is applied to electric antenna 402 are configured or times by pulse shaper 230 such that the resultant RF signals radiated by antennas 401 and 402 are orthogonal in time.

Figure 6:
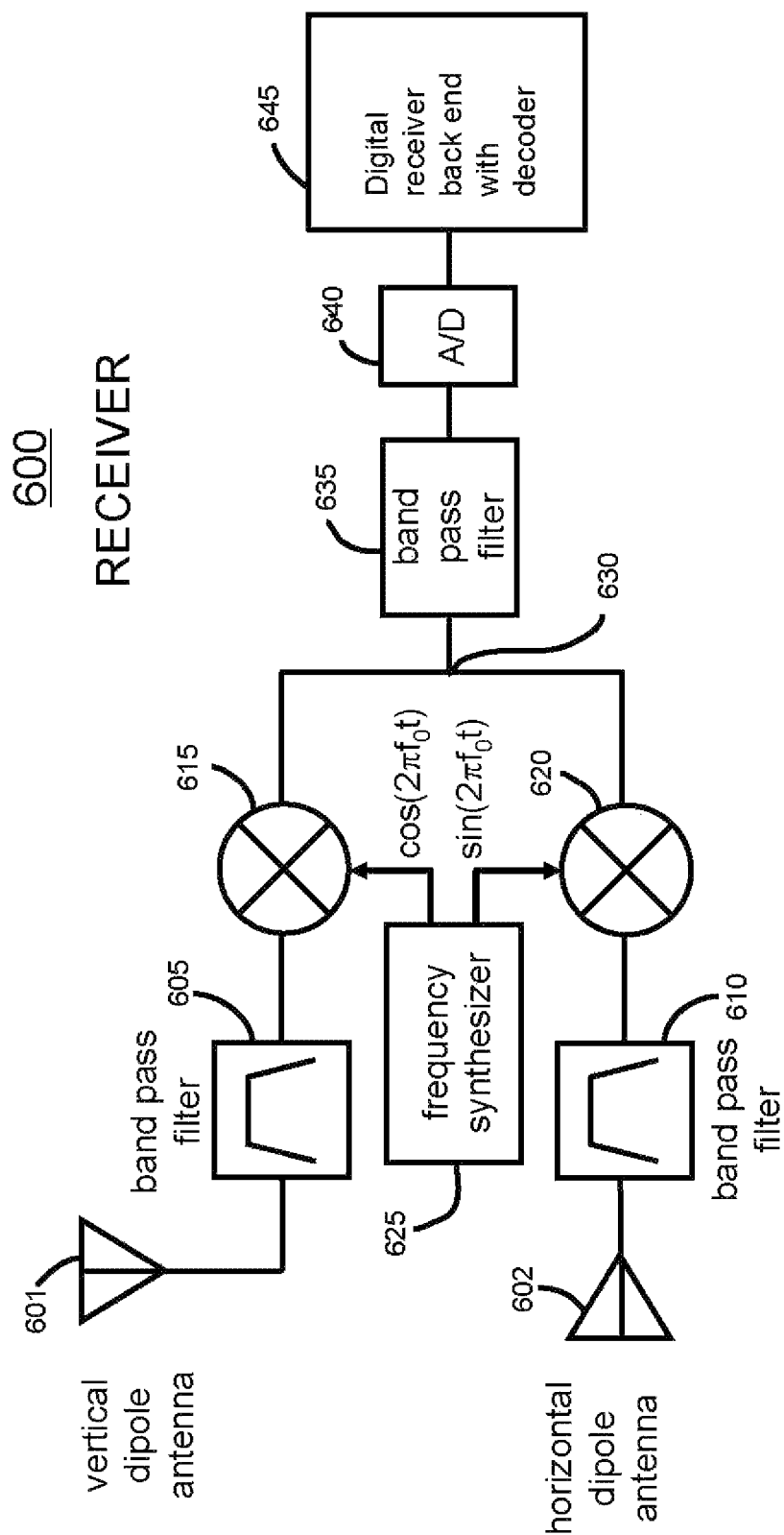
FIG. 6 shows a receiver using a crossed-dipole antenna pair in accordance one embodiment of the disclosed communication system and methodology.

FIG. 6 shows a receiver 600 that uses an orthogonal pair of electric antennas 601 and 602 such as dipole antennas, for example, to receive a UWB pulse signal. Alternatively, antennas 601 and 602 may be magnetic antennas, such as loop antennas, for example. The outputs of two electric (or two magnetic) antennas 601 and 602 are band pass filtered by filters 605 and 610, respectively. The outputs of band pass filters 605 and 610 couple to inputs of mixers 615 and 620, respectively. A frequency synthesizer 625 generates a sine signal and a cosine signal at respective synthesizer outputs. Frequency synthesizer 625 supplies the cosine signal to an input of mixer 615 such that mixer 615 multiplies the band pass filtered signal from antenna 601 by the cosine signal at the UWB pulse center frequency $f_0$. Frequency synthesizer 625 supplies the sine signal to an input of mixer 620 such that mixer 620 multiplies the band pass filtered signal from antenna 602 by the sine signal at the UWB pulse center frequency, $f_0$. The multiplication by sine and cosine signals is a correlation operation that resolves the temporal orthogonality of the two signals. The resultant 2 signals are then additively combined at node 630, low pass filtered by band pass filter 635 and digitally sampled by A/D converter 640. A baseband digital receiver with decoder 645 couples to A/D converter 640 to recover the data previously encoded by the transmitter 500 in the UWB pulse polarity. In this receiver 600, the spatial orthogonality of the UWB pulse signals at antennas 601 and 602 is resolved by identical, but spatially perpendicular orientation of antennas 601 and 602, while the UWB pulse signal orthogonality is resolved by multiplying one received signal by a cosine signal and the other received signal by a sine signal to translate both received UWB pulse signals to baseband for final processing in the digital receiver back end 645.

Figure 7:
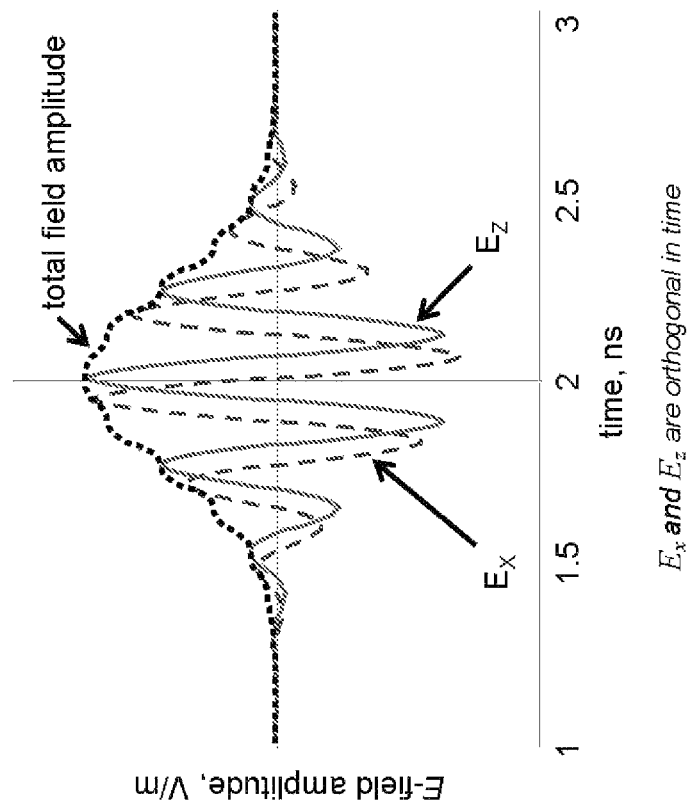
FIG. 7 is an electric field vs. time diagram that shows orthogonal UWB signals in accordance with the disclosed system and methodology.

While representative transmitters and receivers are shown and described above, other configurations and combinations are possible. For example, the transmitters of FIGS. 2, 5, and 17 (with suitable digital processing) may be used with the receivers of FIGS. 3, 6, and 16 (with suitable digital processing) and vice-versa. Moreover, other dual polarized antennas are possible, and other combinations of electric-magnetic elements are possible. A few of the possible embodiments of the invention have been shown by way of example. However, in one embodiment, one or more of the following criteria may be important, namely:

(1) that the transmitting system produces electric fields that are substantially orthogonal in space, namely that $E_\theta$ and $E_\phi$ exhibit substantial orthogonality in space;

(2) that the field shapes generated by the transmitting system occur substantially simultaneously in time, as shown in FIG. 7. The peak of the envelope of one signal substantially corresponds to the peak of the envelope of the other as represented by the total field amplitude in FIG. 7;

(3) that the electric fields $E_\theta(t)$ and $E_\phi(t)$ are substantially orthogonal in time, as shown in FIG. 7. The total amplitude of the composite signal is also shown in FIG. 7. Note that on the y-axis $E_\theta$ corresponds to $E_Z$ and $E_\phi$ corresponds to $E_X$.

Figure 8:
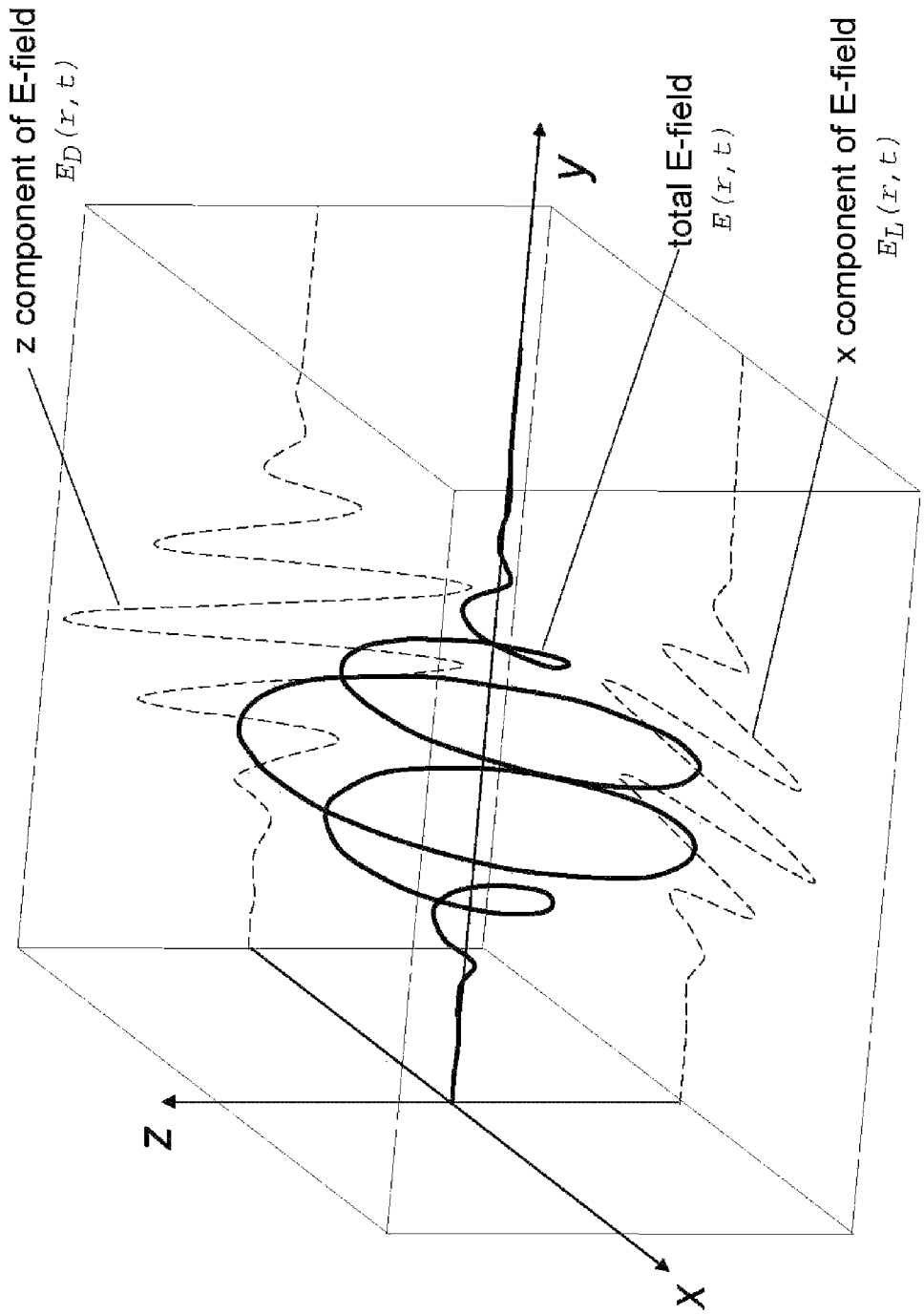
FIG. 8 shows a three-dimensional representation of UWB polarized signals in accordance with the disclosed system and methodology.

FIG. 8 is a three dimensional view that further shows the total signal amplitude of the transmitted UWB pulse signal in space, wherein the peak signal amplitude traces a cork-screw pattern in space. The projection on the z-y plane shows the z-component of the E field and the projection on the x-y plane shows the x-component of the E field. In FIG. 8, the "total E field" exhibits a corkscrew-like or helical-like geometry where the cork screw amplitude over time follows the total field amplitude in FIG. 7.

Figure 9:
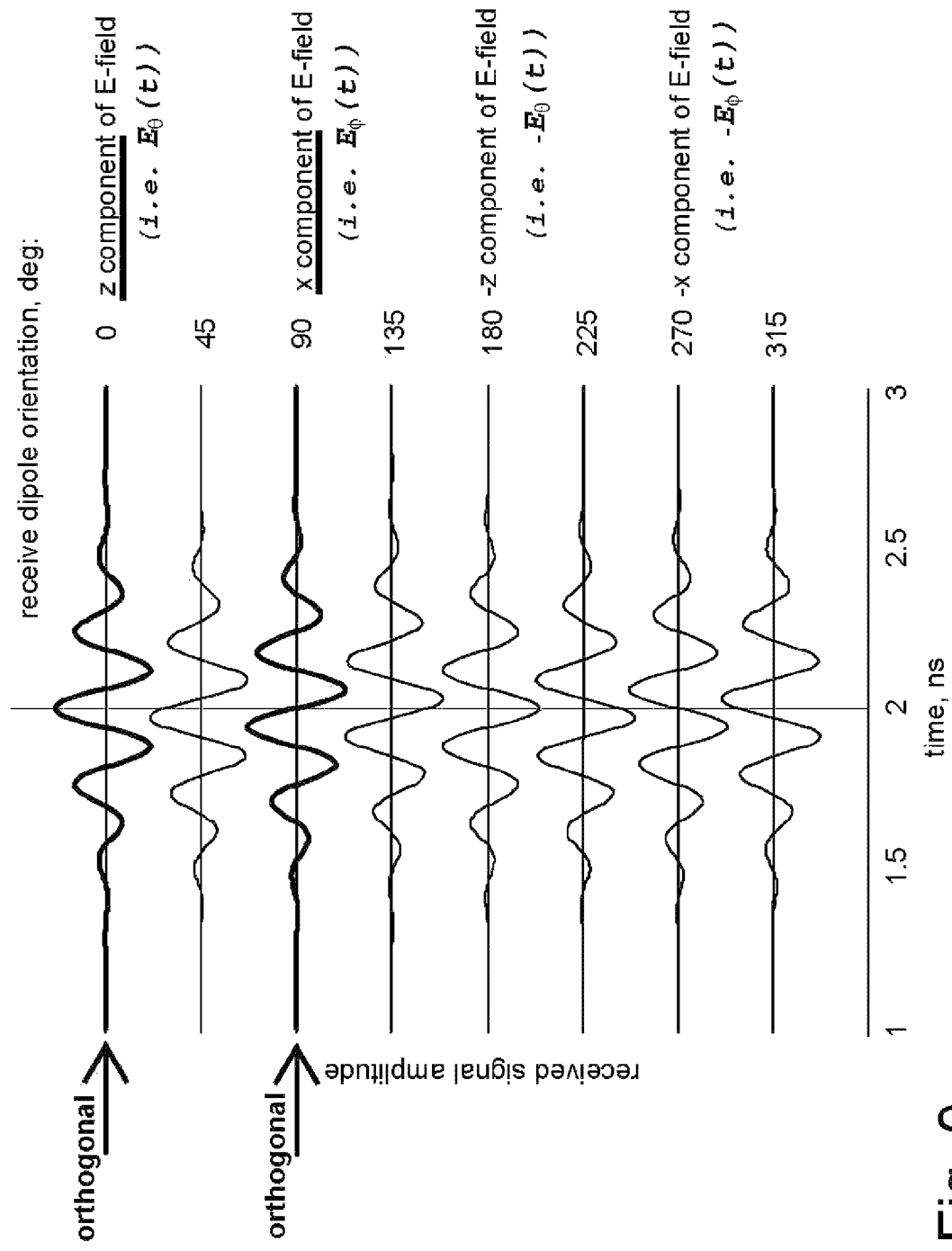
FIG. 9 shows field components received by a dipole of an elliptically polarized UWB signal in space in accordance with the disclosed system and methodology.

FIG. 9 further shows the E field components in space as they would be received by a linearly polarized antenna, for example a dipole, oriented in various planes wherein the antenna is rotated by an angle relative to the z-axis and in the z-x plane. At 0 degrees the field corresponds to the $E_\theta(t)$ field component, while at 90 degrees the $E_\phi(t)$ component is received. At 180 degrees the negative of $E_\theta(t)$ is seen and at 270 degrees the negative of $E_\phi(t)$ received. Intermediate angles show the various combinations as determined from the equation for the combined signal E(r,t), namely Equation 10 below:

$$E(r,t) = E_D(r,t)\hat{\theta} + E_L(r,t)\hat{\phi} \qquad \text{EQUATION 10}$$

Returning to FIG. 8, the envelope value of E(r,t) traces a cork-screw pattern as shown therein, while $E_D(r,t)$ is the signal projected on the y-z plane, and $E_L(r,t)$ is the signal projected on the x-y plane. The total signal envelope or total E-field is also shown, and this envelope corresponds to the amplitude of the baseband UWB pulse shape.

Figure 10:
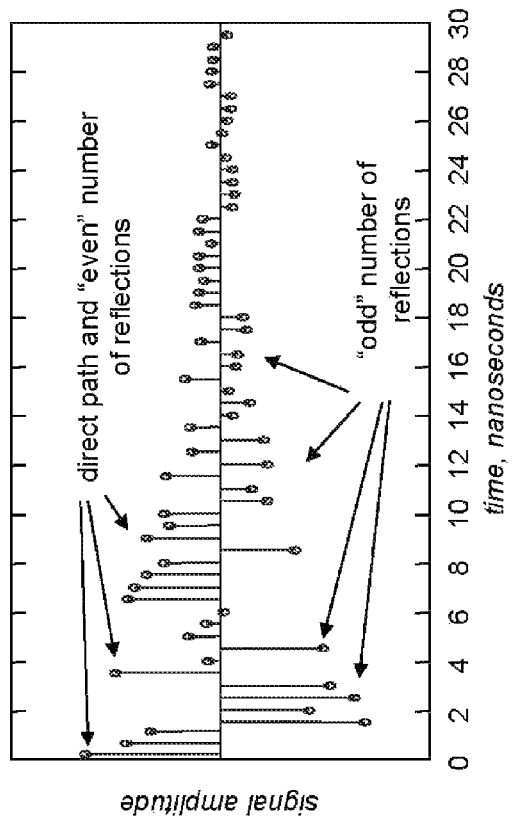
FIG. 10 shows a channel impulse response in a room that depicts multipath components for conventional linear polarization.
Figure 11:
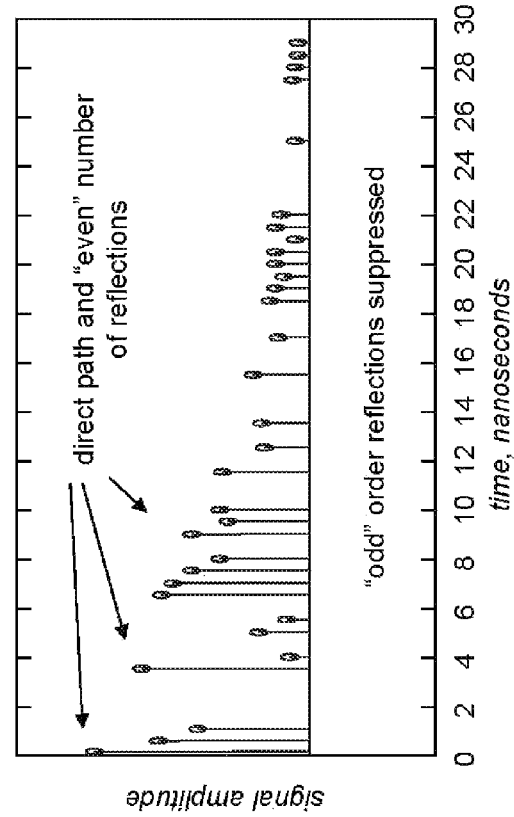
FIG. 11 shows multipath components for circular polarization in accordance with the disclosed system and methodology.

FIG. 10 shows an example of a channel impulse response in a typical room. The x-axis shows time in nanoseconds and the y axis shows relative signal amplitude. Because the reflection coefficient for an electric field is negative, the negative values or amplitudes correspond to signal components with a single or odd number of reflections. In a linearly polarized system like vertical or horizontal polarization, all of these multipath components may appear, thus resulting in a tightly packed multipath profile. Such a tightly packed profile will cause inherent inter-symbol interference (ISI), and thus loss of correlation peak for orthogonal codes and higher probability of false detection. FIG. 10 shows a channel impulse response, which when convolved with a signal such as given by Equation 8 or Equation 9, will result in significant overlap of the convolved signal, and result in significant inter symbol interference (ISI) and thus undesirable data degradation. In FIG. 10, the positive values or amplitudes correspond to signal components with an even number of reflections. For each reflection the sense of the circular polarization is inverted. Thus, in a complete communication system with both transmitter and receiver elliptical or circular polarizations matched, the odd order reflections are suppressed as shown in FIG. 11. More particularly, FIG. 11 shows the negative amplitudes corresponding to the odd numbers of reflections being suppressed. Because the channel impulse response is less dense in FIG. 11, there is correspondingly less ISI, and less signal degradation. In a radar or imaging system which relies on a single reflection, the transmitter and receiver polarizations are of the opposite sense. Thus, in this case the primary reflections are detected, but even order reflections are beneficially suppressed.

Figure 12:
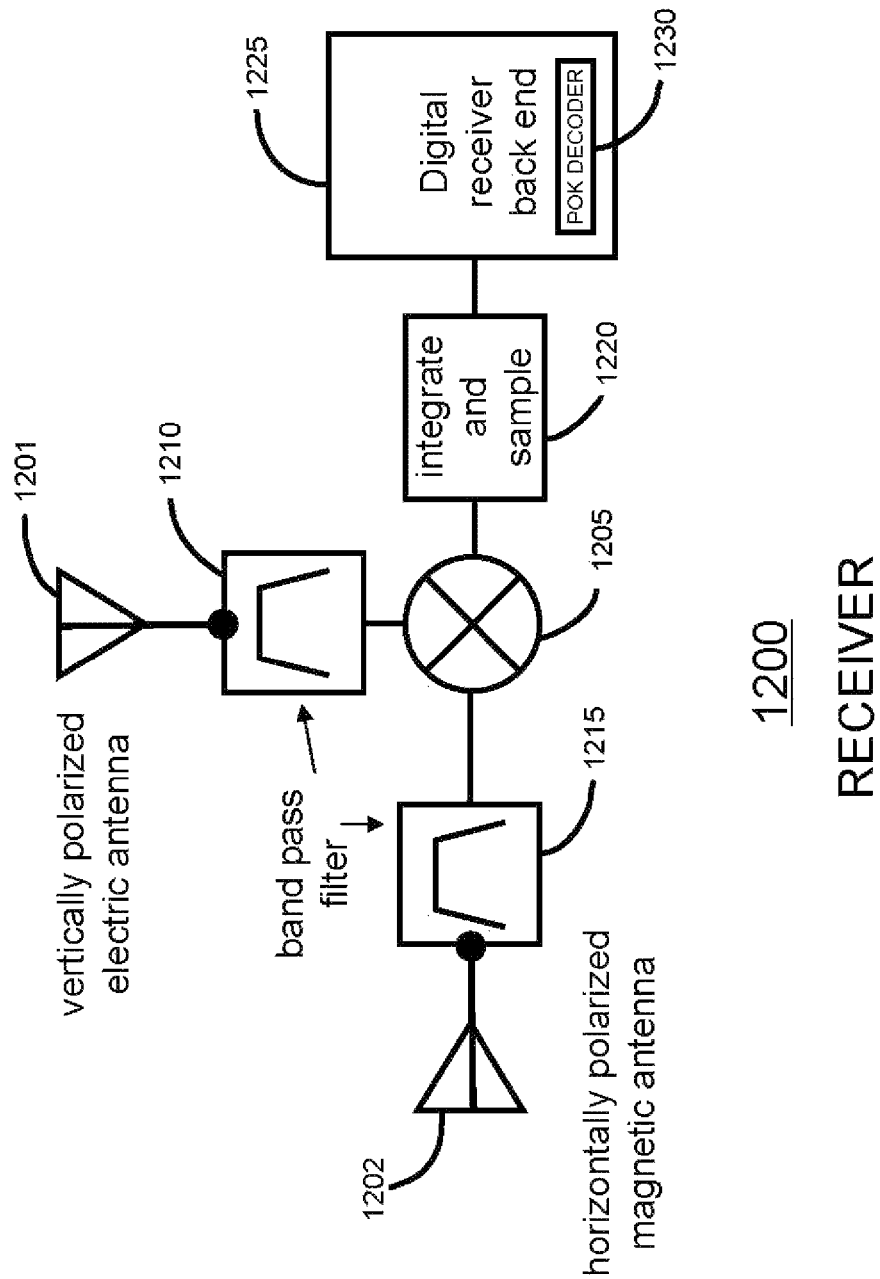
FIG. 12 shows a polarization modulation receiver in accordance with the disclosed system and methodology.

The disclosed system and method further provides for polarization modulation wherein left-handed circular polarization encodes one digital state such as a logic "1" and right-handed circular polarization encodes another digital state such as a logic "0." FIG. 12 shows a polarization modulation receiver 1200 for receiving such polarization encoded signals that may be transmitted by a polarization modulation transmitter such as shown in FIG. 15 below. In the receiver of FIG. 12, the electric antenna 1201 (dipole) and the magnetic antenna 1202 (loop) couple to mixer 1205 via band pass filters 1210 and 1215, respectively. Electric antenna 1201 and magnetic antenna 1202 deliver output signals that are related by a time-derivative, namely one is the time derivative of the other. Thus, the spatially and time-orthogonal fields that impinge on the antennas are normalized by the antennas and delivered to the mixer 1205 as substantially similar signals that differ in polarity depending on whether the field exhibits left-handed or right-handed circular polarization. Recall that, in one embodiment, the transmitted UWB signal is encoded such that a left handed circular polarization signal corresponds to a logic 1 and a right handed circular polarization signal corresponds to an encoded logic 0. The output of the mixer 1205 is thus at the UWB pulse rate and integrates to either "1" or "−1" in the integrate and sample circuit 1220 at the output of mixer 1205. The resultant integrated mixed output signal is then sampled at integrate and sample circuit 1220 and delivered to a digital base band section 1225 of the receiver 1200. Recall again that a left handed circular polarization signal corresponds to a logic 1 and a right handed circular polarization signal corresponds to an encoded logic 0. To decode the received UWB signal, digital receiver back end 1225 includes a POK decoder 1230. The receiver back end 1225 takes the "1" and "−1" signal levels at the integrator and assigns binary logic levels 1 and 0 to them so that the resulting data corresponds to the binary input data that was transmitted by the transmitter. This embodiment of a polarization modulation receiver requires no signal synchronization because the output of mixer 1205 is the product of the two received UWB RF signals from antennas 1201 and 1202.

Figure 13:
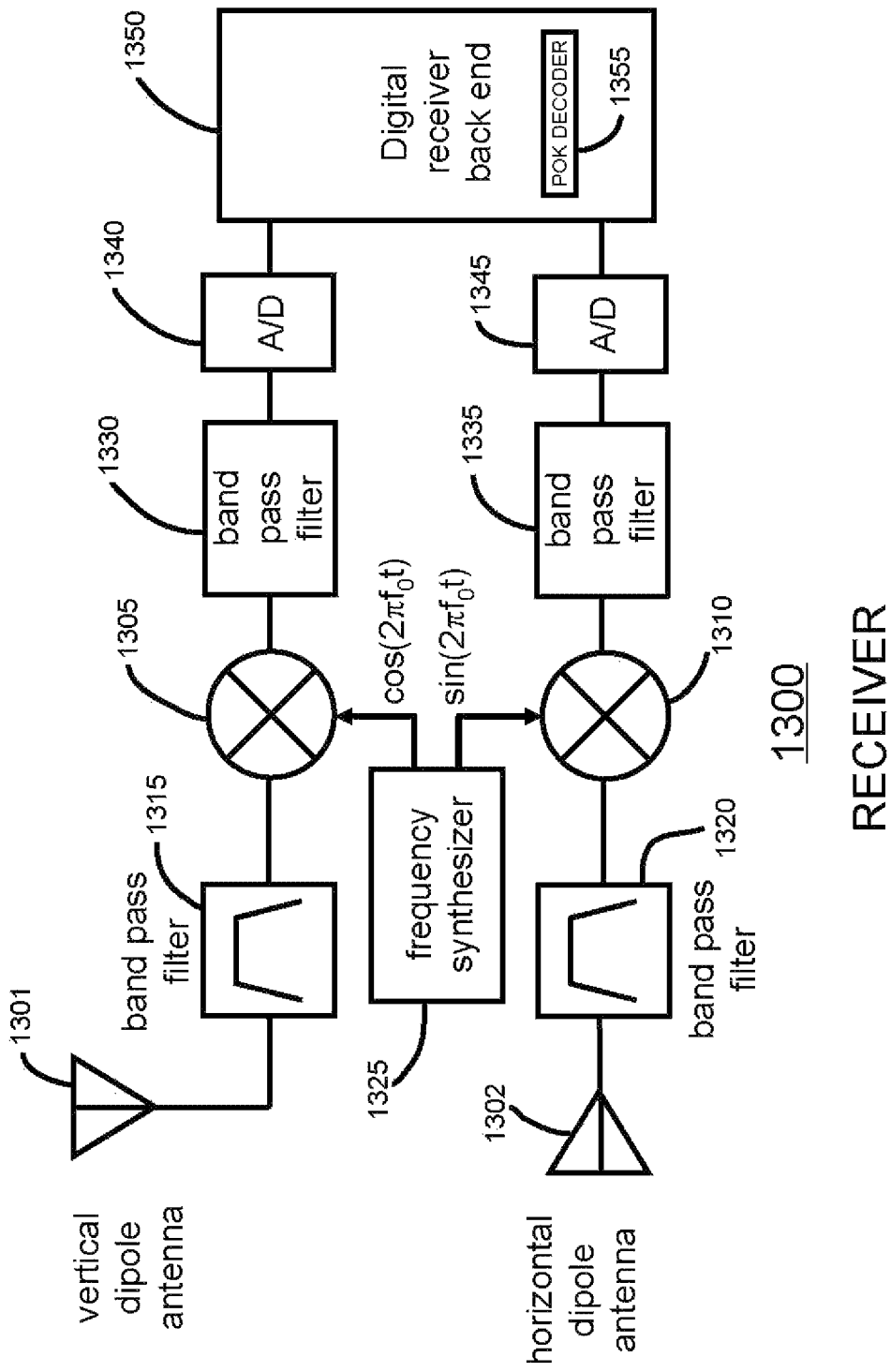
FIG. 13 shows a polarization receiver in accordance with one embodiment of the disclosed system and methodology.

FIG. 13 shows a polarization modulation receiver 1300 using two crossed dipoles 1301 and 1302, namely electric antennas. Crossed dipoles 1301 and 1302 couple to mixers 1305 and 1310 via band pass filters 1315 and 1320, respectively The spatial orthogonality of the received UWB pulse signal on each antenna is normalized by the crossed dipole pair. The time-orthogonality of the received UWB pulse signal on each antenna is resolved by a correlation operation involving cosine and sine multiplications in the mixers 1305 and 1310 which bring the UWB pulses to baseband at the mixer outputs. Frequency synthesizer 1325 supplies a cosine signal and a sine signal to mixers 1305 and 1310, respectively, to translate the received UWB pulses from each antenna to baseband. Finally, the baseband signals are digitized and processed at baseband by band pass filters 1330 and 1335, A/D converters 1340 and 1345, and a digital receiving back end 1350, as shown. In this embodiment of the polarization modulation receiver 1300, the UWB signals may be directly sampled at the antenna, with or without being preceded by a low noise amplifier (LNA, not shown), and the rest of the receive operations may be implemented digitally. For example, digital receiver 1350 may includes a decoder that interprets or transforms the received signals back to data, namely logic 1's and logic 0's. The polarization modulation receiver 1300 of FIG. 13 may be used to receive polarization modulation signals or elliptically polarized signals. To decode POK information that the received UWB signal contains when a transmitter encodes the UWB signal with POK information, digital back end 1350 includes a POK decoder 1355. The decoder 1355 forms symbols corresponding to the four possible signal states resulting form combining the outputs of A/D 1340 and 1345 as shown later in Table 2.

Figure 14A:
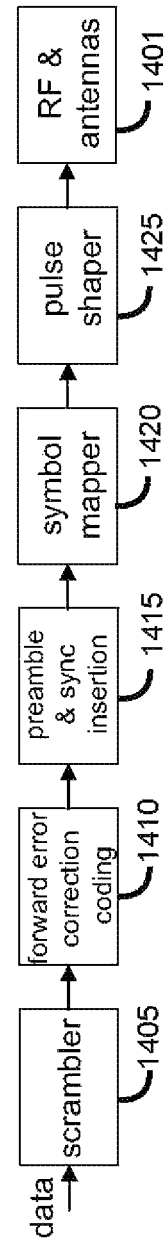
FIG. 14 shows transmit and receiver structures in accordance with the disclosed system and methodology.
Figure 14B:
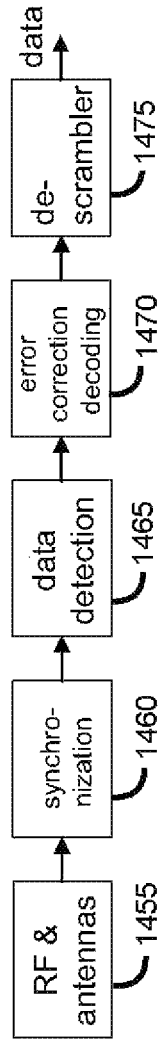

FIGS. 14A and 14B respectively show representative applications of the transmitters and receivers disclosed above. More particularly, FIGS. 14A and 14B respectively show representative implementations of a transmitter system 1400 and a receiver system 1450. The blocks depicted identify process flow steps or stages that may be employed to generate and transmit a signal corresponding to the teachings herein, and to receive and recover the signal and data in accordance with the teachings herein as well.

Transmitter system 1400 may employ transmitter 200 of FIG. 2, transmitter 500 of FIG. 5, transmitter 1500 of FIG. 5 or transmitter 1700 of FIG. 17 as "RF and antennas" stage 1401 in FIG. 14A. In transmitter system 1400 of FIG. 14A, the data are first scrambled to ensure that long sequences of "1's" or "0's" are avoided, as per scrambler block 1405. The resultant scrambled data are then encoded using a forward error correction code, as per block 1410. The code may be shortened for transmission by puncturing. The resulting binary sequence may be interleaved to ensure that any burst errors due to RF propagation between transmitter and receiver are randomized in time. A protocol preamble is pre-appended in block 1415 and the symbols are mapped to the transmission data states in block 1420. Pulse shaper 1425 shapes the signal provided thereto to provide a UWB signal at its output. In some embodiments, forward error correction 1410, preamble and sync insertion 1415 and symbol mapping 1420 are performed by an encoder such as in data buffer and encoder 225 of FIGS. 2 and 5, and data buffer and encoder 1520 of FIG. 15. The resultant shaped binary symbols, now UWB pulses, are then provided to RF transmitter stage and antennas 1401 or wireless UWB transmission to a receiver system 1450 of FIG. 14B. As stated above, "RF and antennas" stage 1401 of FIG. 14A may employ any of the transmitters shown in FIGS. 2, 5, 15 and 17. One transmitter system that employs a scrambler, error correction coding, preamble & sync insertion, symbol mapper and a pulse shaper is described in the IEEE P802.15.4a Amendment to the 802.15.4 Standard which is incorporated herein by reference in its entirety.

Figure 16:
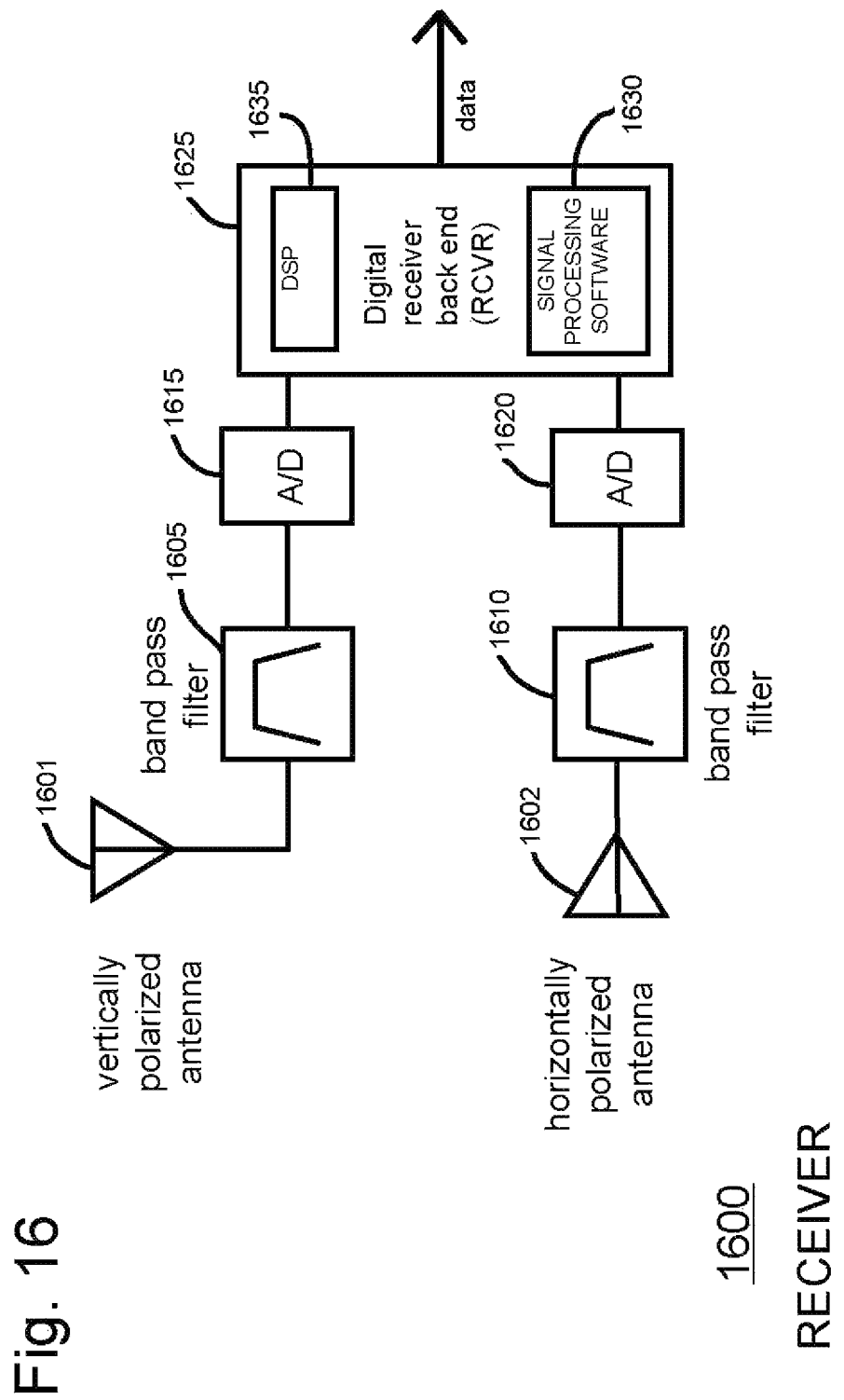
FIG. 16 shows a fully digital receiver embodiment in accordance with the disclosed system and methodology.

Receiver system 1450 may employ receiver 300 of FIG. 3, receiver 600 of FIG. 6, receiver 1200 of FIG. 12, receiver 1300 of FIG. 13, or receiver 1600 of FIG. 16 as "RF and antennas" stage 1455 in FIG. 14B. In the receiver system 1450 of FIG. 14B, the transmitted UWB signal is received by performing the following process steps. The RF section, namely "RF and antennas" 1455, recovers the RF signal. A synchronization block synchronizes to the received signal, as per block 1460. A data detector detects received binary symbols, as per block 1465. An error corrected decoder decodes the received signal according to the particular error correction code that transmitter system 1400 employs, as per block 1470. A descrambler de-scrambles the error decoded signal and supplies the recovered data for presentation to the user, as per block 1475. Not all of the described steps may be needed in some embodiments. For example, when the transmission binary states are differentially encoded on the polarization states, and the receiver 1200 of FIG. 12 is employed, no RF synchronization is needed since that system is self-synchronizing. One receiver system that employs a synchronization block, data detection, error correction decoding and a descrambler is described in the IEEE P802.15.4a Amendment to the 802.15.4 Standard which is incorporated herein by reference it its entirety.

One embodiment contemplates encoding a series of UWB pulses for transmission using polarization modulation. Thus, a long series of pulses can be encoded to represent a single digital data bit. More generally, a longer coded series represents a shorter sequence of digital data. And thus, energy per data bit may be traded off for digital data rate, and the advantages of digital codes including forward error correction and redundancy may be realized for polarization modulation.

In another embodiment, the transmitter encodes data based on a methodology wherein two polarization states can be generated by two signal polarity states of the antenna currents $I_S$ and $I_C$ of Equations 8 and 9, above. In other words, one polarization state is with $I_S$ and $I_C$ both positive, encoding for example a "11" symbol state, or both negative, encoding a "00" symbol state, while the second polarization state is with $I_S$ and $I_C$ having opposite signs in two possible ways, thus $+I_S$ and $-I_C$ encodes a "01" symbol and $-I_S$ and $+I_C$ encodes a "10" symbol. This embodiment thus provides for a 4-state per symbol modulation methodology by using Polarization Orthogonal Keying (POK) of the polarizations states. Two binary bits are sent at the symbol rate. In a UWB example, one symbol is one pulse. Accordingly, a POK system operating at 2 giga-symbols per second in the 8 GHz band transfers bits at a 4 gigabits per second rate over the RF channel.

In another embodiment, the transmitter encodes data based on a methodology wherein four polarization states can be generated by four signal polarity states of the antenna currents $I_S$ and $I_C$ of Equations 8 and 9, above. $I_C$ and $I_S$ can each take on both positive and negative values as well as a zero value, and either $I_S$ or $I_C$ is applied to a vertically polarized (V) antenna or a horizontally polarized (H) antenna. A total of sixteen symbol states are generated by applying currents $I_C$ and $I_S$ to the horizontally and vertically polarized antennas according to the table below:

TABLE 1

| V antenna current (polarity) | H antenna current (polarity) | symbol |
|---|---|---|
| $aI_S$ | 0 | 0000 |
| $aI_C$ | 0 | 0001 |
| $-aI_S$ | 0 | 0010 |
| $-aI_C$ | 0 | 0011 |
| 0 | $aI_S$ | 0100 |
| 0 | $aI_C$ | 0101 |
| 0 | $-aI_S$ | 0110 |
| 0 | $-aI_C$ | 0111 |
| $I_S$ | $I_C$ | 1000 |
| $I_C$ | $I_S$ | 1001 |
| $-I_S$ | $I_C$ | 1010 |
| $-I_C$ | $I_S$ | 1011 |
| $I_S$ | $-I_C$ | 1100 |
| $I_C$ | $-I_S$ | 1101 |
| $-I_S$ | $-I_C$ | 1110 |
| $-I_C$ | $-I_S$ | 1111 |

In one embodiment, the signal amplitude multiplier "a" is preferably equal to the square root of 2 so that an equal amount of energy is represented by each of the 16 symbols. Table 1 above illustrates one possible mapping between symbols and polarization states, and others mappings are contemplated to take advantage of optimum coding techniques. In other words, both linear and circular polarizations are encoded using combinations of antennas to generate horizontally and vertically fields using combinations of both positive and negative currents $I_S$ and $I_C$. This embodiment thus provides for a 16-state per symbol modulation methodology by using Polarization Orthogonal Keying (16-POK) of the polarizations states. Four binary bits are sent at the symbol rate. In a UWB example, one symbol occupies one pulse time period. Accordingly, a 16-POK system operating at 2 giga-symbols per second in the 8 GHz band transfers bits at an 8 gigabits per second rate over the RF channel.

Figure 15A:
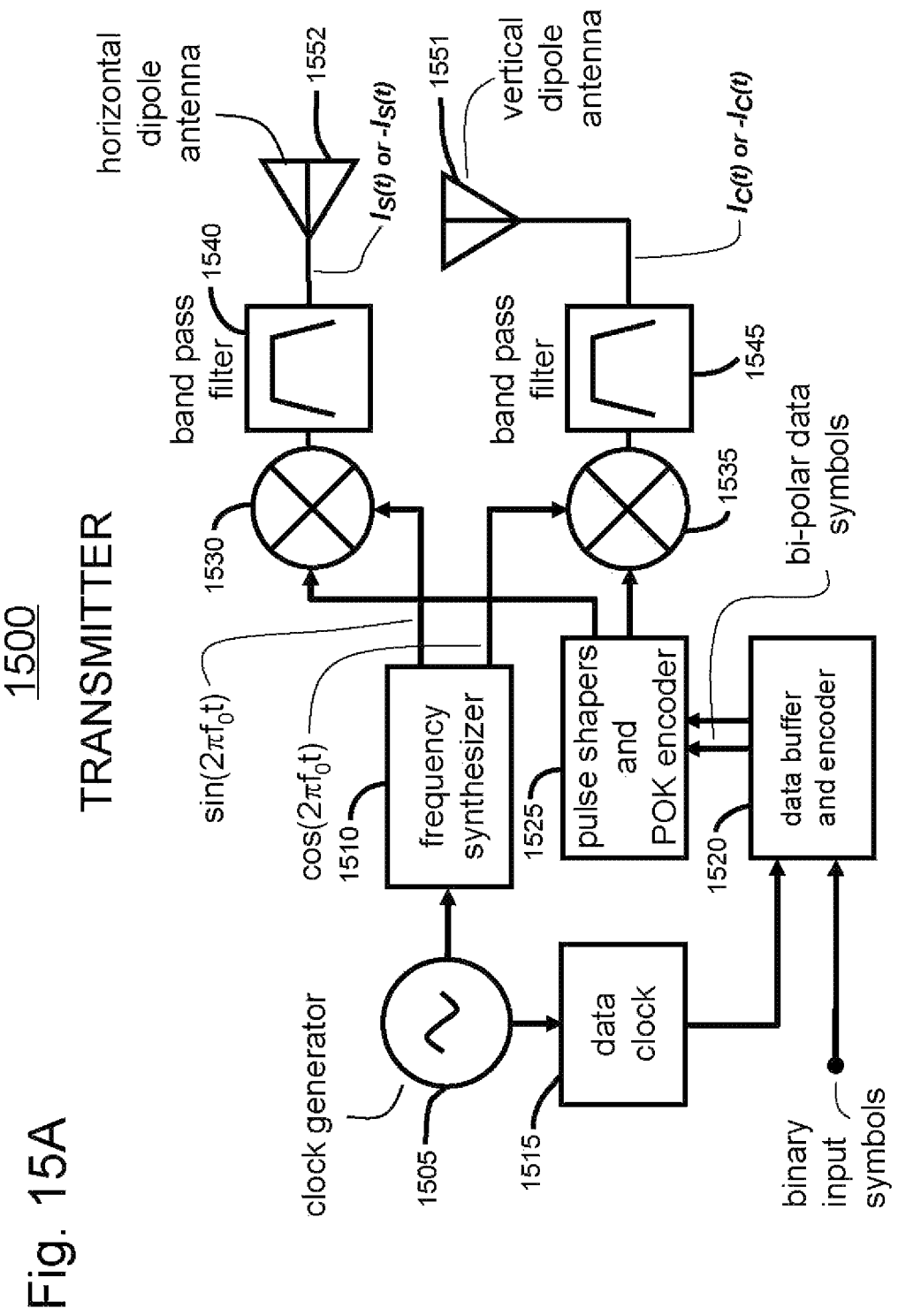
FIG. 15A shows a polarization orthogonal keying (POK) transmitter in accordance with one embodiment of the disclosed system and methodology.

FIG. 15A shows a transmitter 1500 that is configured for polarization orthogonal keying (POK) modulation. A clock generator oscillator 1505 provides a time base to both frequency synthesizer 1510 and data clock 1515. A data buffer 1520 couples to data clock 1515 to receive a clock signal therefrom. Binary input symbols, namely data, at a rate of 2R bits per second are supplied to data buffer 1520 which pairs up two-bits per symbol, wherein the symbol rate is R symbols per second. The pulse shaper and POK encoder 1525 generates UWB pulses at baseband. Pulse shaper and POK encoder 1525 encodes the UWB pulses as shown in Table 2 below. More particularly, pulse shaper and POK encoder 1525 shapes the UWB baseband data pulses and assigns one the 4 POK states (00, 01, 10, 11) which determine the signal polarity combinations that are supplied to the two antennas, namely vertical electric antenna 1505 and horizontal electric antenna 1505.

TABLE 2

Figure 15B:
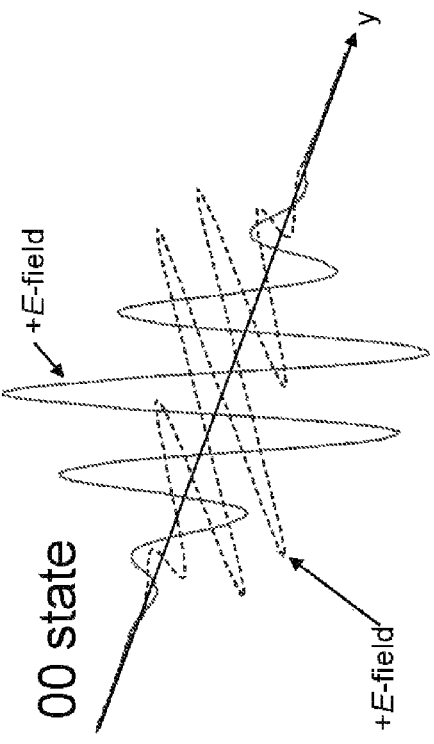
FIG. 15B-15E shows the E fields of the UWB signals radiated by the antennas of FIG. 15A generate for 4 different symbol states.
Figure 15C:
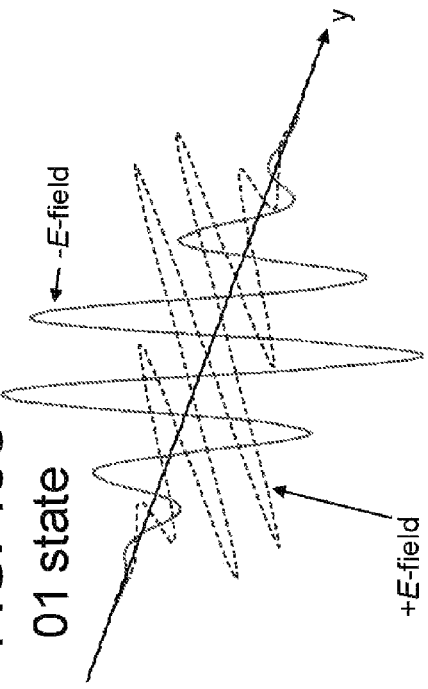
Figure 15D:
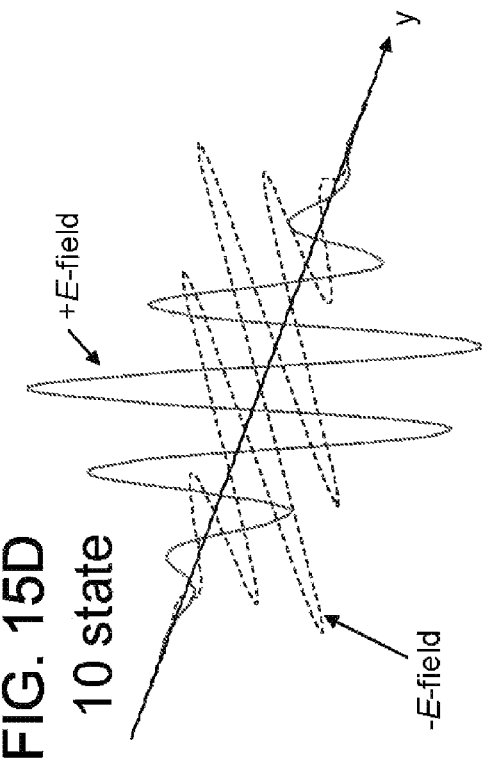
Figure 15E:
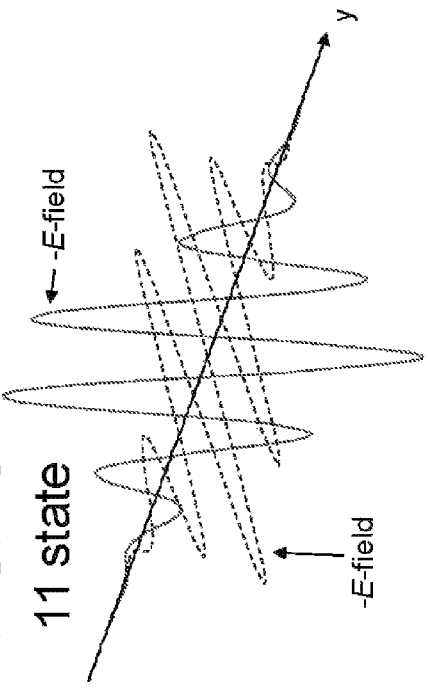

| V (vertical) antenna current ($I_C$ polarity) | H (horizontal) antenna current ($I_S$ polarity) | Symbol Data (POK state) | E Fields of antennas |
|---|---|---|---|
| $I_C$ | $I_S$ | 00 | See FIG. 15B |
| $-I_C$ | $I_S$ | 01 | See FIG. 15C |
| $I_C$ | $-I_S$ | 10 | See FIG. 15D |
| $-I_C$ | $-I_S$ | 11 | See FIG. 15E |

Pulse shapers and POK encoder 1525 supplies a UWB signal to mixer 1530 and another UWB signal to mixer 1535 for translation from baseband to the operating frequency of transmitter 1500. Frequency synthesizer 1510 couples to both mixer 1530 and mixer 1535 to facilitate this translation or up-conversion.

The up-converted UWB signals at the outputs of mixers 1530 and 1535 are filtered by band pass filters 1540 and 1545 before application to horizontal electric dipole antenna 1551 and vertical electric dipole antenna 1552, respectively. In this manner, the data are wirelessly transmitted by the transmitter 1500 of FIG. 15A such that the UWB signal emanating from antenna 1551 and the UWB signal emanating from antenna 1552 together convey the symbol data depicted in Table 2 above.

For example, if pulse shaper-POK encoder 1525 causes vertical electric dipole antenna 1551 to be excited by a positive current, $I_C$, and electronic dipole antenna 1552 to be excited by a positive current, $I_S$, this corresponds to transmission of the symbol 00. In this case, antennas 1551 and 1552 transmit UWB signals shown by FIG. 15B for the 00 symbol state. Note that the E fields of the respective UWB signals transmitted by the two antennas are both orthogonal in time and orthogonal in space.

However, if pulse shaper-POK encoder 1525 causes vertical electric dipole antenna 1551 to be excited by a negative current, $-I_C$, and electronic dipole antenna 1552 to be excited by a positive current, $I_S$, this corresponds to transmission of the symbol 01. In this scenario, antennas 1551 and 1552 transmit UWB signals shown by FIG. 15C for the 01 symbol state. Note that once again the respective E fields of the two UWB signals transmitted by the two antennas are both orthogonal in time and orthogonal in space.

If pulse shaper-POK encoder 1525 causes vertical electric dipole antenna 1551 to be excited by a positive current, $I_C$, and electronic dipole antenna 1552 to be excited by a negative current, $-I_S$, this corresponds to transmission of the symbol 10. In this case, antennas 1551 and 1552 transmit UWB signals shown by FIG. 15D for the 10 symbol state. The respective E fields of the two UWB signals are again both orthogonal in time and orthogonal in space.

However, if pulse shaper-POK encoder 1525 causes vertical electric dipole antenna 1551 to be excited by a negative current, $-I_C$, and electronic dipole antenna 1552 to be excited by a negative current, $I_C$, this corresponds to transmission of the symbol 11. In this scenario, antennas 1551 and 1552 transmit UWB signals shown by FIG. 15E for the 11 symbol state. The respective E fields of the two UWB signals transmitted by the two antennas are both orthogonal in time and orthogonal in space.

To receive and decode the transmitted signals of transmitter 1500, the receiver 1300 of FIG. 13 may be used to interpret the polarity conditions at the outputs of the two A/D converters 1340 and 1345 to recover symbols from the symbol map (00, 01, 10, 11) corresponding to the transmitted symbol. Returning again to the transmitter 1500 of FIG. 15A, the input symbols at the input of the data buffer 1520 can also be coded for protection against RF channel errors during RF transmission. In one polarization orthogonal keying (POK) embodiment, such forward error control coding (FEC) is combined with POK.

The polarization modulation taught herein, including POK, while shown by way of example for UWB pulses, is also suitable for narrow band systems, such as a system wherein the pulses are temporally long compared with the period of the operating center frequency. Although two senses (left-handed and right-handed) of circular polarization were shown as projections in Fig. pairs 15B and 15C and Fig. pairs 15D and 15E, any two orthogonal polarizations may be used, for example vertical linear polarization and horizontally linear polarization.

FIG. 16 shows a fully digital receiver 1600 that may be employed in the disclosed wireless communication system. Signals from the two spatially orthogonal antennas, namely a "vertical dipole" 1610 and a "horizontal dipole" 1602, are band pass filtered by filters 1605 and 1610, respectively. The two resultant filtered signals are then directly digitally sampled by analog to digital converters 1615 and 1620, respectively. Spatially orthogonal magnetic antennas such as loop antennas could also be used in place of the vertical dipole 1601 and horizontal dipole 1602 which are both electric antennas. Digital receiver 1625 accepts the digital samples from A/D converters 1615 and 1620 and performs the signal reception steps equivalent to the analog implementation of the receiver, such as the analog receiver of FIG. 12, or of FIG. 13. In other words, the software 1630 in the digital receiver back end (RCVR) 1625 replicates the analog functions of the receivers of FIG. 12 or 13. Thus, FIG. 16 is a "software defined radio" that includes polarization dependent inputs that are employed in one embodiment of the disclosed system and method. Alternatively, the two antennas that receiver 1600 employs may be an orthogonally polarized pair of electric and magnetic antennas, wherein the spatial orthogonality is resolved by the antennas, but the signal orthogonality may be resolved by signal processing in the back end, or by using both an electric and a magnetic antenna. Signal processing software 1630 in the digital receiver back end 1625 takes this into account depending on the type of antennas employed. Digital receiver back end 1625 software may also decode polarization encoded signals that receiver 1600 receives from a polarization orthogonal keying (POK) transmitter.

Figure 18:
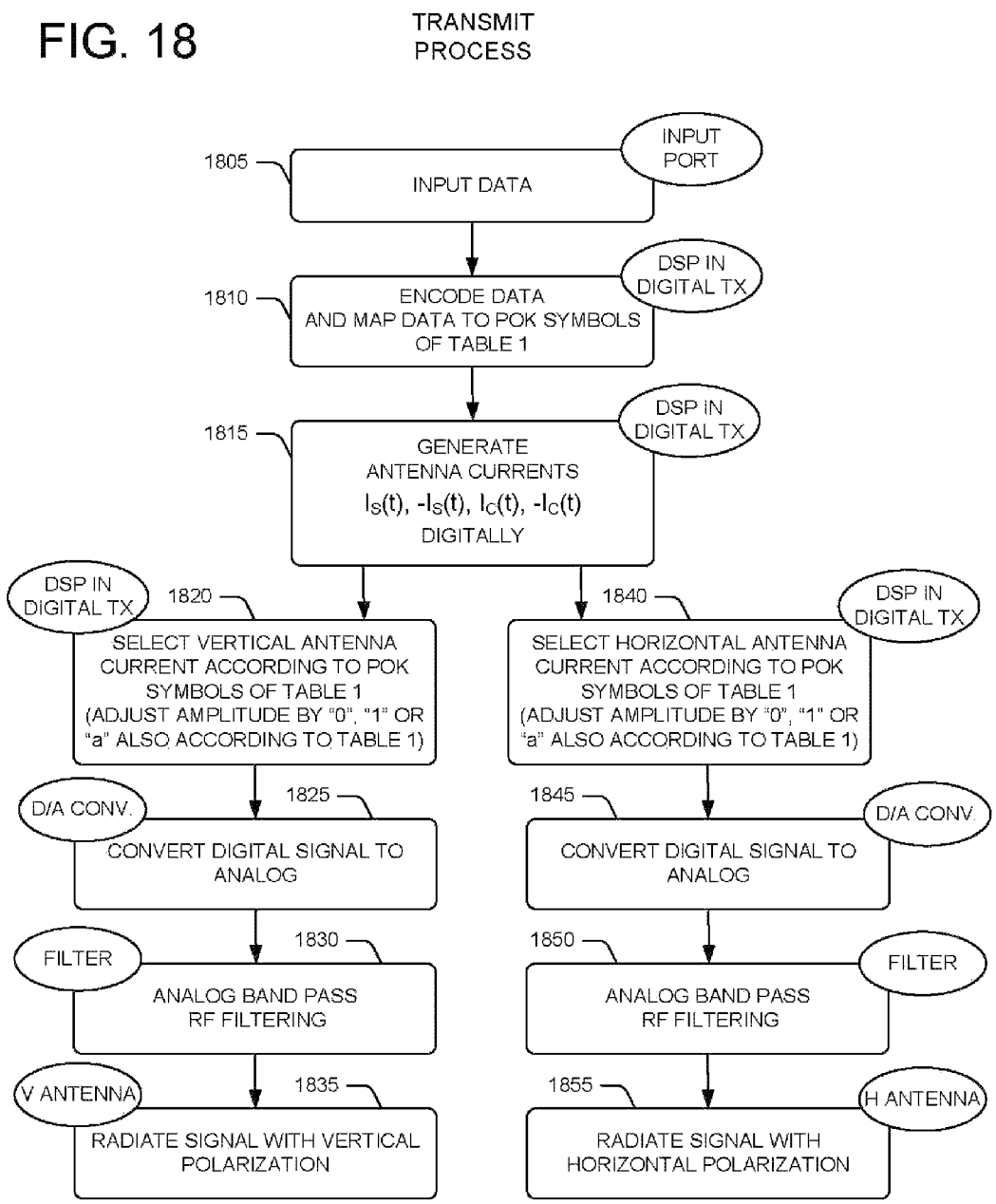
FIG. 18 is a flowchart that depicts representative steps in the transmission of UWB signals in the disclosed methodology.

FIG. 17 shows a fully digital transmitter (TX) 1700 that may be employed in the disclosed wireless communication system. The required temporally orthogonal signals supplied to the two antennas 1701 and 1702 are generated by signal processing software 1704 in digital transmitter 1705 and are supplied to the two antennas 1701 and 1702 via respective digital to analog converters (D/As) 1710 and 1715, as shown. RF band pass filters 1720 and 1725 respectively couple the D/As 1710 and 1715 to antennas 1701 and 1702. When a pair of spatially orthogonal but identical antennas (two loops or two dipoles) are used as antennas 1701 and 1702, the signal processing software 1704 in the digital transmitter block 1705 times the generation of the two drive signals it provides to antennas 1701 and 1702 to achieve the temporal orthogonality in the signals that antennas 1701 and 1702 radiate. When an electric-magnetic antenna pair is used to achieve the spatially orthogonal polarizations in the signals radiated by antennas 1701 and 1702, the antennas additionally emit temporally orthogonal signals as was described above, and the signal processing software 1704 instructs digital transmitter block 1705 to supply the same drive current to each antenna port. Data to be transmitted via antennas 1701 and 1702 is provided to data input 1730 of transmitter 1700. In one embodiment, digital transmitter 1705 includes a digital signal processor (DSP) 1735 that handles signal generation processes under the control of signal processing software 1704. In this manner, antennas 1701 and 1702 are provided with respective UWB signals that are temporally orthogonal. FIG. 18 is a flow chart that describes representative steps that signal processing software 1704 and other components of transmitter 1700 perform so that transmitter 1700 provides antennas 1701 and 1702 with the desired UWB signals.

FIG. 18 is a flowchart that depicts process flow in one embodiment of the disclosed method of transmitting a UWB signal. While the disclosed transmit process is usable to transmit different types of data with different symbols and mappings, the flowchart of FIG. 17 is discussed with reference to transmitter 1700 of FIG. 17 and symbol mapping Table 1 above. Data is supplied to a data input or port 1730, as per input data block 1805. As directed by signal processing software 1704, digital signal processor (DSP) 1735 encodes the data and maps the data to the POK symbols of Table 1, as per block 1810. DSP 1735 then selects and generates two of the antenna currents $I_S(t)$, $-I_S(t)$, $I_C(t)$, $-I_C(t)$ digitally, as specified by the symbol mapping of Table 1, as per block 1815. The selected two currents, after further processing, are supplied to vertically polarized antenna 1701 and horizontally polarized antenna 1702 as appropriate under the mapping of Table 1.

While transmitter 1700 may transmit signals that indicate any of the symbols of Table 1, for simplicity, transmission of the symbol "1010" is now discussed. Referring to Table 1, to transmit a signal corresponding to the symbol 1010, transmitter 1700 supplies a current $-I_S(t)$ to vertically polarized antenna 1701 and a current $I_C(t)$ to horizontally polarized antenna 1702. More specifically, to cause generation of such antenna currents, DSP 1735 selects a vertical antenna current according to the POK symbols of Table 1 and adjusts the amplitude by "0", "1" or "a" according to Table 1 (here an amplitude "1" in the generation of symbol 1010), as per block

1820. D/A converter 1710 then converts the digital signal that DSP 1735 generates into the desired vertical antenna current $-I_S(t)$ signal, as per block 1825. Band pass filter 1720 provides band pass filtering to the $-I_S(t)$ current signal, as per block 1830. Vertically polarized antenna 1701 (V antenna), then radiates a UWB signal with vertical polarization in response to excitation by the $-I_S(t)$ current, as per block 1835. Now turning to the generation of the corresponding horizontally polarized UWB signal for symbol "1010", DSP 1735 selects a horizontal antenna current according to the POK symbols of Table 1 and adjusts the amplitude by "0", "1" or "a" according to Table 1 (here an amplitude "1" in the generation of symbol 1010), as per block 1840. D/A converter 1715 then converts the digital signal that DSP 1735 generates into the desired horizontal antenna current $I_C(t)$ signal, as per block 1845. Band pass filter 1725 provides band pass filtering to the $I_C(t)$ current signal, as per block 1850. Horizontally polarized antenna 1702 (H antenna), then radiates a UWB signal with horizontal polarization in response to excitation by the $I_C(t)$ current, as per block 1855.

Figure 19:
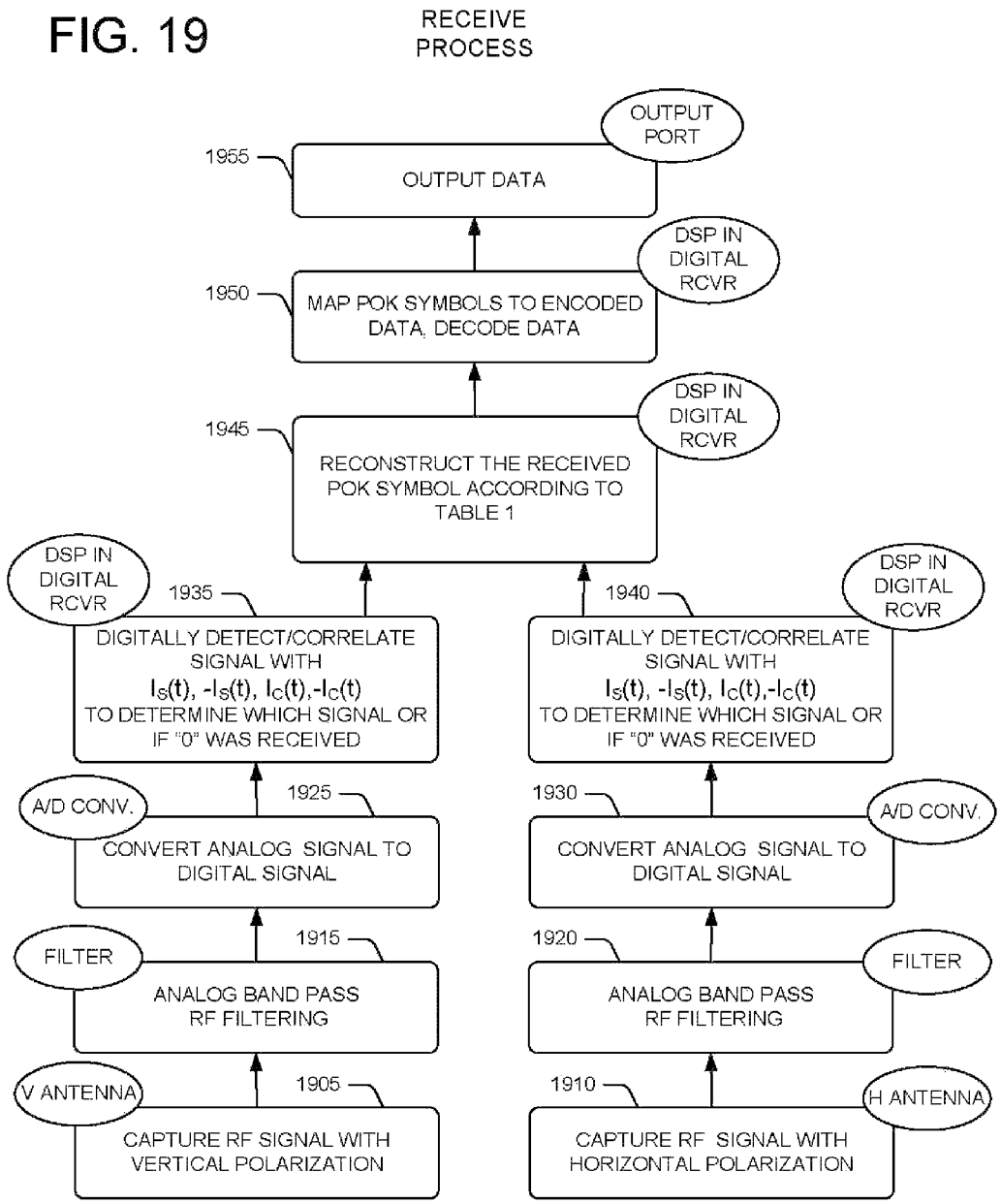
FIG. 19 is a flowchart that depicts representative steps in the reception of UWB signals in the disclosed methodology.

FIG. 19 is a flowchart that depicts process flow in one embodiment of the disclosed method of receiving a UWB signal by receiver 1600 of FIG. 16. In this flowchart, process flow starts at the bottom of the flowchart with the capture of a vertically polarized RF signal by antenna 1601 (V antenna), as per block 1905, and with the capture of a horizontally polarized RF signal by antenna 1602 (H antenna), as per block 1910. Band pass filters 1605 and 1610 provide band pass filtering to the respective vertical and horizontal antenna signals, as per blocks 1915 and 1920. Analog to digital (A/D) converters 1615 and 1620 convert the respective filtered signals provided thereto into digital voltage values (V and H voltages). This digital voltage (V voltage) is a digital voltage value that represents the signal from vertically polarized antenna 1601, as per block 1925. The digital voltage (H voltage) is digital voltage value that represents the signal from horizontally polarized antenna 1602, as per block 1930. Digital receiver back end 1625 includes signal processing software 1630 that controls DSP 1635 as it interprets or converts the received signals from antennas 1601 and 1602 back into data by using the mapping provided in Table 1. More specifically, DSP 1635 under the direction of control software 1630 digitally detects and correlates the filtered V voltage with $I_S(t)$, $-I_S(t)$, $I_C(t)$, $-I_C(t)$ to determine which signal or if a "0" is received, as per block 1935. Similarly, DSP 1940 digitally detects and correlates the filtered H voltage with $I_S(t)$, $-I_S(t)$, $I_C(t)$, $-I_C(t)$ to determine which signal or if a "0" is received, as per block 1940. DSP 1635 then reconstructs the received POK symbol according to Table 1, as per block 1945. DSP 1635 maps the POK symbols to encoded data and then decodes the data, as per block 1950. Finally, DSP 1635 outputs the received data, as per block 1955

A system and method are described above for transmission and reception of elliptically polarized UWB signals. In one embodiment, the transmission system uses true elliptical polarization, and when the two E field components are equal in magnitude the polarization is circular. Thus, in one embodiment, one or more of the attributes of circular polarization, such as a reduction in multipath for narrow band signals, can be enjoyed for UWB signals without compromising the transmission capacity suffered by other methods such as chiral polarization. An elliptical polarization modulation method and system is described herein for transmitting polarization encoded signals, and for receiving them. In one embodiment, the disclosed elliptical polarization method includes circular polarization as one example. Coding may be used to improve the performance in such an embodiment. It is noted that chiral polarization does not provide the needed orthogonality between the UWB signals that are in space-quadrature as per the disclosed communication system and methodology, so the benefits of elliptical polarization transmission may not be fully realized in that technique.

In one embodiment, a UWB transmission system is disclosed that can produce a radiated electric (E) field with two E field components that are both orthogonal in time as well as in space, and wherein the emitted elliptically polarized signal is transmitted in the same channel time that is required for a linearly polarized system. One disclosed embodiment employs two substantially similar or identical antennas such as a dipole-dipole pair (an electric-electric pair) that are geometrically oriented to provide spatial orthogonality between the respective electric (E) fields radiated by each. For example, orienting one dipole perpendicular to the other dipole antenna generates two E fields wherein one E field is perpendicular to the other E field. Equivalently a pair of loops can be oriented perpendicularly geometrically to provide the same spatial orthogonality effect. In this case wherein two identical antennas are used, the transmitter configures two different antenna drive current signals to provide the temporal orthogonality between the E fields radiated by the two antennas. For example, one antenna drive signal is a UWB drive current signal while the other antenna drive current signal is the time derivative of the UWB drive current signal. However, when different antennas are employed for the two antennas, as for the case of a loop-dipole pair (magnetic-electric pair), the transmitter can drive each of the two antennas with the same antenna current drive signal because the orthogonality in time is provided by the different way in which fields and antenna signals are related for the two different antennas. In this case, spatial orthogonality between the two E fields generated by the respective antennas is caused by the geometric orientation of one antenna with respect to the other. For example, the plane of the loop antenna is perpendicular to the dipole antenna. The electric field of a loop is oriented in the plane of the loop, and the electric field of the dipole is oriented along the axis of the dipole.

In one embodiment, a UWB receiving system is disclosed that includes an antenna system that captures the transmitted UWB pulse signal wherein the peak signal amplitude traces a cork-screw pattern in space such as shown in FIG. 8. In that elliptically polarized UWB signal, the UWB signal exhibits a first signal portion or E field component, $E_D(r,t)$ that is spatially and temporally orthogonal to a second signal portion or E field component, $E_L(r,t)$. The timing diagram of FIG. 9 shows the temporal orthogonality of these two signals as a "z" component of the E field ($E_\theta(t)$) that is 90 degrees out of phase with respect to an "x" component of the E-field ($E_\phi(t)$). A receiver such as receiver 1200 of FIG. 12 receives the elliptically polarized signal including its spatially and temporarily orthogonal components. The antenna system of receiver 1200 includes an antenna 1201 and an antenna 1202 that are respectively sensitive to the two spatially orthogonal components of the transmitted UWB signal. The voltages at antennas 1201 and 1202 follow the amplitudes of the respective E fields to which they are sensitive. For example, in the case of vertically polarized electric antenna 1201 and horizontally polarized magnetic antenna 1202 in receiver 1200 of FIG. 12, the voltage at antenna 1201 follows the amplitude of the E field component to which it is sensitive, namely the "z" component of the E field ($E_\theta(t)$), while the voltage at antenna 1202 follows the amplitude of the E field component to which it is sensitive, namely the "x" component of the E-field ($E_\phi(t)$). In this case, the configuration or orientation of the two antennas 1201 and 1202 resolves the spatial orthogonality of the two signal components. In other words, the two antennas resolve the received UWB signal that it captures into the two spatially orthogonal received signal components, namely the "x" and "z" components. Similarly, in the case of vertically polarized electric antenna 1301 and horizontally polarized electric antenna 1302 in receiver 1300 of FIG. 13, the voltage at antenna 1301 follows the amplitude of the E field component to which it is sensitive, namely the "z" component of the E field ($E_\theta(t)$), while the voltage at antenna 1302 follows the amplitude of the E field component to which it is sensitive, namely the "x" component of the E-field ($E_\phi(t)$). Again, in this case, the configuration or orientation of the two antennas 1201 and 1202 resolves the spatial orthogonality of the two signal components.

With the spatial orthogonality of the two signal components resolved as described above, the receiver performs additional processing on the two signal components to deal with the temporally orthogonality between the two signal components. In the case of receiver 1200 in FIG. 12 with its magnetic and electric antenna system, mixer 1205 multiplies the two signal components from electrical antenna 1201 and magnetic antenna 1202 together to resolve the temporal orthogonality of the two signal components. In other words, mixer 1205 combines the two signal components. However, in the case of receiver 1300 of FIG. 13 with its two electric antennas 1301 and 1302, the mixer 1305 multiplies or mixes the signal component from antenna 1301 by a cosine wave and the mixer 1310 multiplies or mixes the signal component from antenna 1302 with a sine wave to resolve the temporal orthogonality of the two received signal components.

Modifications and alternative embodiments of this invention will be apparent to those skilled in the art in view of this description of the invention. Accordingly, this description teaches those skilled in the art the manner of carrying out the invention and is to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. An ultra-wideband (UWB) transmission system, comprising:
   an antenna system that is configured to emit first and second radiated RF UWB signals that are orthogonally polarized in space when the antenna system is driven by first and second drive UWB signals, respectively; and
   a transmitter, coupled to the antenna system, that drives the antenna system with the first and second drive UWB signals, the first and second drive UWB signals being configured to cause the first and second radiated RF UWB signals to be orthogonal in time and to occur simultaneously in time when emitted by the antenna system;
   wherein the antenna system comprises an electric antenna and a magnetic antenna that are co-located and oriented to emit the first and second radiated RF UWB signals that are orthogonal in space, and the transmitter drives both the electric antenna and the magnetic antenna with the same drive signal such that the first and second radiated RF UWB signals are orthogonal in time.

2. The UWB transmission system of claim 1, wherein the E fields of the first and second radiated RF UWB signals are simultaneously orthogonal in space and orthogonal in time.

3. The UWB transmission system of claim 1, wherein
   the antenna system comprises first and second electric antennas that are co-located and oriented approximately 90 degrees apart from one another to emit the first and second radiated RF UWB signals that are orthogonal in space, and
   the transmitter drives the first electric antenna with the first drive UWB signal and drives the second electric antenna with the second drive UWB signal, the second drive UWB signal being orthogonal in time with respect to the first drive UWB signal.

4. The UWB transmission system of claim 3, wherein the first and second electric antennas are dipoles.

5. The UWB transmission system of claim 1, wherein the second drive UWB signal is the time derivative of the first drive UWB signal.

6. The UWB transmission system of claim 1, wherein the transmitter includes a first mixer that provides the first drive UWB signal and a second mixer that provides the second drive UWB signal as the time derivative of the first drive UWB signal.

7. The UWB transmission system of claim 1 wherein the electric antenna is a dipole and the magnetic antenna is a loop.

8. The UWB transmission system of claim 2, wherein the E fields of the first and second radiated RF UWB signals are elliptically polarized.

9. The UWB transmission system of claim 1, wherein the transmitter encodes the first and second radiated RF UWB signals with a first polarization to designate a logic 1 and a second polarization to designate a logic 0.

10. A method of transmitting RF ultra-wideband (UWB) signals by a UWB transmission system, the method comprising:
    configuring an antenna system to emit first and second radiated RF UWB signals that are orthogonally polarized in space when the antenna system is driven by first and second drive UWB signals; and
    supplying, by a transmitter, the first and second drive UWB signals to the antenna system, the first and second drive UWB signals being configured to cause the first and second radiated RF UWB signals to be orthogonal in time when emitted by the antenna system;
    wherein the configuring the antenna system step includes:
      co-locating and orienting an electric antenna and a magnetic antenna to form the antenna system and emit the first and second radiated RF UWB signals that are orthogonal in space;
    wherein the supplying step includes:
      driving, by the transmitter, the electric antenna with the first drive UWB signal; and
      driving, by the transmitter, the magnetic antenna with the second drive UWB signal, the first and second drive UWB signals being the same drive signal such that the first and second radiated RF UWB signals are orthogonal in time.

11. The method of transmitting of claim 10, wherein the E fields of the first and second radiated RF UWB signals are simultaneously orthogonal in space and orthogonal in time.

12. The method of transmitting of claim 10,
    wherein the configuring the antenna system step includes:
      co-locating first and second electric antennas to form the antenna system;
      orienting the first and second electric antennas at angles of approximately 90 degrees apart from one another such that the first and second radiated RF UWB signals are orthogonal in space; and
wherein the supplying step includes:
driving, by the transmitter, the first electric antenna with the first drive UWB signal; and
driving, by the transmitter, the second electric antenna with the second drive UWB signal, the second drive UWB signal being orthogonal in time with respect to the first drive UWB signal.

13. The method of transmitting of claim 12, wherein the first and second electric antennas are dipoles.

14. The method of transmitting of claim 10, wherein the second drive UWB signal is the time derivative of the first drive UWB signal.

15. The method of transmitting of claim 10,
providing, by a first mixer, the first drive UWB signal; and
providing, by a second mixer, the second drive UWB signal as a time derivative of the first drive UWB signal.

16. The method of transmitting of claim 10, wherein the electric antenna is a dipole and the magnetic antenna is a loop.

17. The method of transmitting of claim 11, wherein the E fields of the first and second radiated RF UWB signals are elliptically polarized.

* * * * *